(12) United States Patent
Stansbury et al.

(10) Patent No.: US 10,968,300 B2
(45) Date of Patent: Apr. 6, 2021

(54) CONTROL OF POLYMER NETWORK STRUCTURES VIA NANOGELS

(71) Applicant: THE REGENTS OF THE UNIVERSITY OF COLORADO, A BODY CORPORATE, Denver, CO (US)

(72) Inventors: Jeffrey W. Stansbury, Denver, CO (US); Devatha P. Nair, Denver, CO (US); Steven H. Lewis, Denver, CO (US)

(73) Assignee: THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 139 days.

(21) Appl. No.: 16/311,121

(22) PCT Filed: Jun. 23, 2017

(86) PCT No.: PCT/US2017/039111
§ 371 (c)(1),
(2) Date: Dec. 18, 2018

(87) PCT Pub. No.: WO2017/223511
PCT Pub. Date: Dec. 28, 2017

(65) Prior Publication Data
US 2020/0247927 A1    Aug. 6, 2020

Related U.S. Application Data

(60) Provisional application No. 62/354,049, filed on Jun. 23, 2016.

(51) Int. Cl.
| | |
|---|---|
| *C08J 3/07* | (2006.01) |
| *C08F 20/06* | (2006.01) |
| *C08F 220/14* | (2006.01) |
| *C08F 220/18* | (2006.01) |
| *C08G 18/81* | (2006.01) |
| *C08F 2/48* | (2006.01) |
| *C08F 2/00* | (2006.01) |
| *C08F 2/38* | (2006.01) |
| *C08F 2/04* | (2006.01) |
| *C09J 175/16* | (2006.01) |
| *C08F 222/10* | (2006.01) |
| *C08F 220/06* | (2006.01) |

(52) U.S. Cl.
CPC .............. *C08F 220/14* (2013.01); *C08F 2/00* (2013.01); *C08F 2/04* (2013.01); *C08F 2/38* (2013.01); *C08F 2/48* (2013.01); *C08F 220/1811* (2020.02); *C08G 18/8116* (2013.01); *C09J 175/16* (2013.01); *C08F 220/06* (2013.01); *C08F 220/1804* (2020.02); *C08F 222/102* (2020.02); *C08F 222/1063* (2020.02); *C08F 222/1065* (2020.02)

(58) Field of Classification Search
CPC ...... C08F 2/00; C08F 2/04; C08F 2/38; C08F 2/48; C08F 220/06; C08F 220/14; C08F 220/1804; C08F 220/1811; C08F 222/102; C08F 222/1063; C08F 222/1065; C08G 18/81; C08G 18/8116; C09J 175/16
See application file for complete search history.

(56) References Cited

U.S. PATENT DOCUMENTS

| 9,138,383 B1 | 9/2015 | Stansbury |
| 2015/0257985 A1 | 9/2015 | Sadowsky et al. |

OTHER PUBLICATIONS

Tyler J. D'Ovidio, Rebecca M. Roberts, Dixa Gautam, Zefram D. Marks, Manju Saraswathy, Jeffrey W. Stansbury, Devatha P. Nair, Photopolymerization kinetics of methyl methacrylate with reactive and inert nanogels, Journal of the Mechanical Behavior of Biomedical Materials,vol. 85,2018,pp. 218-224 (Year: 2018).*
Junyi Han et al, Intramolecular-initiating photopolymerization behavior of nanogels with the capability of reducing shrinkage. J. Mater. Chem. C, 2016, 4, 10675-10683 (Year: 2016).*
Nie, J., Lindén, L., Rabek, J., Fouassier, J., Morlet-Savary, F., Scigalski, F., Wrzyszczynski, A. and Andrzejewska, E. (1998), A reappraisal of the photopolymerization kinetics of triethyleneglycol dimethacrylate initiated by camphorquinone for dental purposes. Acta Polym., 49, 145-161 (Year: 1998).*
Charlot et al., Photopolymerization of methyl methacrylate: effects of photochemical and photonic parameters on the chain length, The Royal Society of Chemistry, Polymer Chemistry, 2014, 8 pages.
Moraes et al., "Control of Polymerization Shrinkage and Stress in Nanogel-Modified Monomer and Composite Materials", Dental Materials, 2011, pp. 509-519, vol. 27.
Moraes et al., "Improved Dental Adhesive Formulation Based on Reactive Nanogel Additives", Journal of Dental Research, Feb. 2012, pp. 179-184, vol. 91, Issue 2.

(Continued)

*Primary Examiner* — Sanza L. McClendon
(74) *Attorney, Agent, or Firm* — Cantor Colburn LLP

(57) ABSTRACT

A method of increasing a polymerization reaction rate of a base monomer composition that has slow free-radical polymerization kinetics. The method comprises combining an effective amount of a nanogel to the base monomer composition to form a monomer-nanogel mixture having a polymerization reaction rate that is greater than the polymerization reaction rate of the base monomer composition when subjected to an identical free-radical polymerization reaction conducted under identical conditions. The base monomer composition comprises one or more slow-kinetic monomers with slow free radical polymerization kinetics in which <25% of the double bonds are converted within the first 10 mintes of said reaction. The nanogel is soluble in the base monomer composition. The nanogel is derived from a nanogel-forming monomer mixture that comprises: at least one monovinyl monomer; at least one divinyl monomer; a chain transfer agent; and an initiator.

23 Claims, 25 Drawing Sheets

(56) References Cited

OTHER PUBLICATIONS

Raemdonck et al., "Advanced Nanogel Engineering for Drug Delivery", Soft Matter, 2009, pp. 707-715, vol. 5 No. 4.
Matsumoto, et al., "In-Situ Kinetic Pursuit of Emulsion Crosslinking Copolymerizations of Monomethacrylate and Dimethacrylate by Means of ReactIR®" Macromol. Rapid Commun. 2001, vol. 22 (607-610).

* cited by examiner

| Nanogel Loading | | | |
|---|---|---|---|
| Discontinuous | Percolation Threshold | Co-continuous | Confluent |
|  |  |  |  |

|  | Nanogel | PMMA | PMMA + 1 wt% nanogel | |
|---|---|---|---|---|
|  |  |  | Nanogel | PMMA |
| Mw (Da) | 115,000 | 195,000 | 1,640,000 | 167,000 |
| Rh (nm) | 7.0 | 8.9 | 21.3 | 8.1 |

CONTROL OF POLYMER NETWORK STRUCTURES VIA NANOGELS

CROSS-REFERENCE TO RELATED APPLICATIONS

This patent application is a 35 U.S.C. § 371 National Phase Application of International Patent Application No. PCT/2017/039111, filed Jun. 23, 2017, claiming the benefit of U.S. Provisional Patent Application Ser. No. 62/354,049, filed Jun. 23, 2016, which are incorporated herein by reference in their entireties.

STATEMENT REGARDING FEDERALLY SPONSORED RESEARCH OR DEVELOPMENT

This invention was made with government support under contract DE022348 awarded by the National Institutes of Health. The government has certain rights in the invention.

BACKGROUND OF INVENTION

Poly(methyl methacrylate) (PMMA) is one of the most extensively used thermoplastics in the world in applications that range from construction materials to consumer electronics and medical devices. PMMA and other linear polymers such as n-butyl acrylate, isobornyl acrylate, etc. are typically mass-produced via the free radical polymerization of a monomer. In the case of PPMA, the monomer is methyl methacrylate (MMA) using a thermal initiator such as 2,2'-azobis(2-methylpropionitrile) (AIBN) or peroxide-based initiators. To produce optical quality organic glass (such as in PLEXIGLAS™) bulk polymerization of the monomer MMA and cell casting is used. Typically, a partially polymerized slurry of "MMA syrup" (MMA with dissolved PMMA, used to increase the viscosity and aid in processing) is cast between panes of float-glass and submerged in heated water to cure at temperatures ≤40° C. to avoid formation of bubbles from boiling of monomer due to exothermic polymerization. The polymerization of methacrylate groups is generally slow, and the curing process for PMMA can take in excess of 10 hours, making the process extremely energy intensive. To decrease the cure time, often a mixture of MMA and a Prepolymer of PMMA is utilized.

While a thermally initiated cure of MMA to PMMA is the established method for industrial manufacture, the slow reaction kinetics of MMA to PMMA is a disadvantage that limits or excludes its usage in applications such as dental materials and modern manufacturing methods such as 3D printing. The extremely energy intensive and inefficient polymerization kinetics of MMA to PMMA can take upwards of 10 hours and has led to alternative, efficient cure mechanisms for MMA to be explored. Over the past decade, the photoinitiation of MMA to PMMA via free radical polymerization of functional molecules upon irradiation with ultraviolet or visible light has tested and used in limited applications. In addition to the spatial and temporal control ("cure on command") afforded by photoinitiating reactions, the intense near-UV radiation required to initiate the reaction can be efficiently produced using light emitting diode (LED) arrays at the appropriate wavelength (e.g. 405 nm for GaN LEDs). Using radical photoinitiators rather than thermoinitiators could greatly reduce the amount of energy required to polymerize PMMA and has the potential to extend the range of applications in which PMMA can be utilized. However, the limiting factor in both thermal- and photo-initiated polymerization of PMMA is the intrinsically slow reaction kinetics of the methacrylate polymerization. To date, improving the phopolymerization kinetics of MMA has had limited success. Additives and composite are known to increase the polymerization kinetics, but the efficiency is attained usually at the expense of desirable mechanical properties.

The limiting factor in both thermal and photo-initiated polymerization of PMMA, however, remains the intrinsically slow reaction kinetics of the methacrylate polymerization. To date, there has been limited success in improving the photopolymerization kinetics of MMA (Charlot, 2014). Different comonomer additives and composite are known to increase the polymerization rate, but usually at the expense of desirable mechanical properties.

Thus, a need still exists for increasing the polymerization reaction of rates of slow-kinetic polymers such as PMMA without detrimentally affecting other physical properties of the base polymer (e.g., mechanical and/or optical properties).

SUMMARY OF INVENTION

One embodiment of the invention is directed to a method of increasing a polymerization reaction rate of a base monomer composition that has slow free-radical polymerization kinetics, the method comprising combining an effective amount of a nanogel to the base monomer composition to form a monomer-nanogel mixture having a polymerization reaction rate that is greater than the polymerization reaction rate of the base monomer composition when subjected to an identical free-radical polymerization reaction conducted under identical conditions;
   wherein the base monomer composition comprises one or more slow-kinetic monomers with slow free radical polymerization kinetics in which <25% of the double bonds are converted within the first 10 mintes of said reaction; and
   wherein the nanogel is soluble in the base monomer composition and wherein the nanogel is derived from a nanogel-forming monomer mixture that comprises:
   at least one monovinyl monomer;
   at least one divinyl monomer;
   a chain transfer agent; and
   an initiator.

In embodiments of the foregoing method, wherein the nanogel has an effective diameter in a range selected from the group consisting of about 1.5 nm to about 50 nm, about 1 nm to about 200 nm, about 1 nm to about 100 nm, and about 1 nm to about 50 nm.

In one embodiment of the foregoing methods, the nanogel has a molecular weight in a range of about 5 kDa to about 200 kDa.

In one embodiment of the foregoing methods, the effective amount of a nanogel corresponds to a nanogel loading of at least 1 weight %.

In one embodiment of the foregoing methods, the free-radical polymerization reaction is photo-initiated or thermal-initiated or its is photo-initiated.

In one embodiment of the foregoing methods, the slow-kinetic monomer(s) are selected from the group consisting of methyl methacrylate (MMA), n-butyl acrylate, isbornyl acrylate, and combinations thereof.

In one embodiment of the foregoing methods, the nanogel is selected from the group consisting of a non-reactive nanogel, a reactive nanogel, partially reactive nanogel, and combinations thereof.

In one embodiment of the foregoing methods, the nanogel is a non-reactive nanogel. In an embodiment thereof, the non-reactive nanogel is at a nanogel loading not exceeding about 50 wt %. In another embodiment thereof, the non-reactive nanogel is at a nanogel loading in a range of about 5 wt % to about 25 wt %. In another embodiment thereof, the non-reactive nanogel is at a nanogel loading in a range of about 50 wt % to about 75 wt %.

In an alternative embodiment to that set forth in the immediate preceding paragraph, the nanogel is a reactive nanogel. In an embodiment thereof, the reactive nanogel is at a nanogel loading not exceeding 25 wt %. In another embodiment thereof, the reactive nanogel is at a nanogel loading in a range of about 1 wt % to about 10 wt %. In another embodiment thereof, the reactive nanogel is at a nanogel loading in a range of about 25 wt % to about 50 wt %.

In an alternative embodiment to that set forth in the two preceding paragraphs, the nanogel is a partially reactive nanogel.

In one embodiment, the nanogel is a reactive nanogel selected from the group consisting of thiol-functionalize nanogels.

In one embodiment of the foregoing methods, the chain transfer agent is selected from the group consisting of monofunctional thiols, difunctional thiols, trifunctional thiols, tetrafunctional thiols, pentafunctional thiols, hexafunctional thiols, octafunctional thiols, and bis(borondifluorodimethylglyoximate) cobaltate (II).

In one embodiment of the foregoing methods, the chain transfer agent is selected from the group consisting of propyl mercaptan, butyl mercaptan, hexyl mercaptan, octyl mercaptan, dodecanethiol, thioglycolic acid, methylbenzenethiol, dodecanethiol, mercaptopropionic acid, 2-ethyl hexyl thioglycolate, octylthioglycolate, mercaptoethanol, mercaptoundecanoic acid, thiolactic acid, thiobutyric acid, trimethylol propane tris(3-mercaptopropionate), pentaerythritol tetra(3-mercaptopropionate), pentaerythritol tetrathioglycolate, pentaerythritol tetrathiolactate, pentaerythritol tetrathiobutyrate; dipentaerythritol hexa(3-mercaptopropionate), dipentaerythritol hexathioglycolate; tripentaerythritol octa(3-mercaptopropionate), and tripentaerythritol octathioglycolate.

One embodiment of the present invention is directed to a monomer-nanogel mixture according to any one of foregoing methods.

One embodiment of the present invention is directed to a method for preparing a polymer, wherein the method comprises polymerizing the monomer-nanogel mixture according to any one of the foregoing methods.

One embodiment of the present invention is directed to a polymer derived from the monomer-nanogel mixture according to any one of foregoing methods.

DETAILED DESCRIPTION OF INVENTION

Introduction

Figure 1:
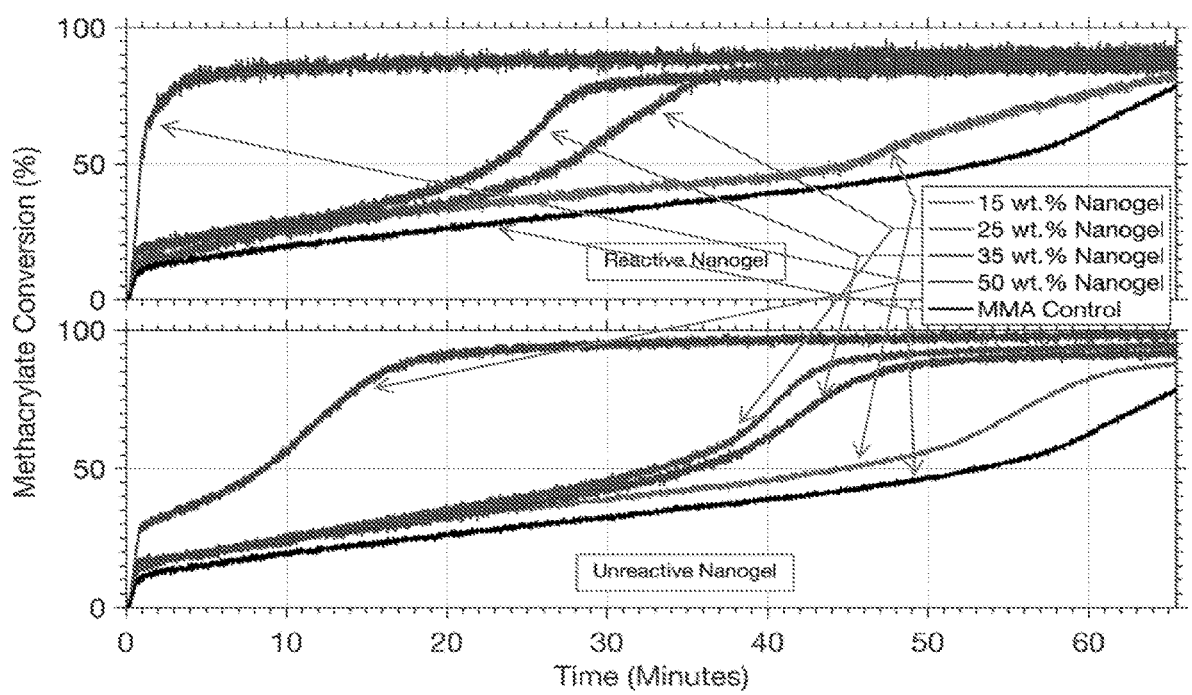
FIG. 1 is a graph of the degree of polymerization of methyl methacrylate (MMA) as a function of time (i.e., the photopolymerization kinetics) for MMA-nanogel mixtures at different concentrations of nanogel for both reactive and unreactive nanogel as described in detail in Example 1.

The disclosure provides methods to achieve dispersible or compatible nanogels that can be used as reactive additives in monomer systems. The nanogels, depending upon the application, may be hydrophilic, hydrophobic, or amphillic. More particularly, it is directed to using including nanogels with a base monomer composition having slow free-radical polymerization kinetics to increase the rate of reaction rate of the base monomer composition. Advantageously, an increased reaction rate may be achieved little or no effect on physical properties of the cured polymer. If desired, however, one may select nanogel compositions that tend to be more reactive and/or one may select an amount of nanogel relative to the base monomer to affect one or more physical properties of the cured polymer (e.g., toughness, glass transition temperature (Tg), flexural strength, flexural modulus, refractive index, etc.). One particular use of this technology is for increase the polymerization rate for methyl methacrylate (MMA) monomers, which may be used in a variety applications, including dental adhesives, sealants and varnishes, bone cements, adhesives and other in situ-formed biomedical devices, waterborne UV-curable coatings; modifiers for existing UV-curable coatings used in microelectronics, displays, solar panels, etc. In particular, a UDMA/JMAA nanogel has been found to be useful for high wet strength applications.

Terminology

A "polymer" is a substance composed of macromolecules. A polymer macromolecule is a molecule of high relative molecular mass, the structure of which comprises the multiple repetition of units derived from molecules of low relative molecular mass.

A "branched polymer" is a polymer that includes side chains of repeat units connecting onto the main chain of repeat units (different from side chains already present in the monomers). A branched polymer refers to a non-linear polymer structure, but typically, not a network structure. Therefore, a trace forward from the branch point would not bridge back to the original main chain (i.e., minimal or no backbone crosslinking is present). A branched polymer would generally be soluble in an appropriate solvent.

A "crosslinked polymer" is a polymer that includes interconnections between chains, either formed during polymerization (by choice of monomer) or after polymerization (by addition of a specific reagent). In a crosslinked polymer network, with the crosslinks serving as branch points, it is possible to trace a continuous loop back to the backbone. The crosslinked network would be insoluble in all solvents.

A "network polymer" is a crosslinked polymer that includes two or more connections, on average, between chains such that the entire sample is, or could be, a single molecule. Limited crosslink connections per chain would be considered lightly crosslinked while numerous crosslinks would be considered highly (or heavily) crosslinked.

A "copolymer" is a material created by polymerizing a mixture of two, or more, starting compounds. The resultant polymer molecules contain the monomers in a proportion which is related both to the mole fraction of the monomers in the starting mixture and to the reaction mechanism.

A "filler" is a solid extender which may be added to a polymer to modify mechanical, optical, electrical, thermal, flammable properties, or simply to act as an extender. The filler can be reactive or inert in the polymerization.

An "extender" is a substance added to a polymer to increase its volume without substantially altering the desirable properties of the polymer.

The term "inert matrix" comprises, for example, water, an inert solvent, or a combination of water and an inert solvent.

The term "alkyl", "aliphatic" or "aliphatic group" as used herein means a straight-chain or branched $C_{1-20}$ hydrocarbon chain that is completely saturated or that contains one or more units of unsaturation, or a monocyclic $C_{3-8}$ hydrocarbon or bicyclic $C_{8-12}$ hydrocarbon that is completely saturated or that contains one or more units of unsaturation, but which is not aromatic (also referred to herein as "carbocycle" or "cycloalkyl"), that has a single point of attachment to the rest of the molecule wherein any individual ring in said bicyclic ring system has 3-7 members. For example, suitable alkyl groups include, but are not limited to, linear or branched or alkyl, alkenyl, alkynyl groups and hybrids thereof such as (cycloalkyl)alkyl, (cycloalkenyl)alkyl or (cycloalkyl)alkenyl.

The terms "alkoxy," "hydroxyalkyl," "alkoxyalkyl" and "alkoxycarbonyl," used alone or as part of a larger moiety include both straight and branched chains containing one to twelve carbon atoms. The terms "alkenyl" and "alkynyl" used alone or as part of a larger moiety shall include both straight and branched chains containing two to twelve carbon atoms.

The term "heteroatom" means nitrogen, oxygen, or sulfur and includes any oxidized form of nitrogen and sulfur, and the quaternized form of any basic nitrogen. The term "aryl" used alone or in combination with other terms, refers to monocyclic, bicyclic or tricyclic carbocyclic ring systems having a total of five to fourteen ring members, wherein at least one ring in the system is aromatic and wherein each ring in the system contains 3 to 8 ring members. The term "aryl" may be used interchangeably with the term "aryl ring". The term "aralkyl" refers to an alkyl group substituted by an aryl. The term "aralkoxy" refers to an alkoxy group substituted by an aryl.

A vinyl, or "-ene," functional group suitable for embodiments of the present invention includes any monomer having one or more vinyl functional groups, i.e., reacting "—C=C—" groups. Synonyms for a vinyl functional group include the terms olefinic group, alkenyl group, and ethylenic group.

Nanogel

Traditionally, the term "nanogel" means a polymer gel particle having any shape with an equivalent diameter of approximately a few to 100 nm. "Nanogel" describes the interconnected localized network structures as well as appropriately describing the physical dimensions of the polymer gel particle. Nanogels are typically soluble in the solvent in which they are made and nanogels may be further made to be soluble in various liquids as necessary depending on the monomers used in their manufacture. However, nanogels can also be prepared in the absence of solvent (in bulk) and subsequently dissolved in an appropriate solvent or monomer composition.

As used herein, the term "nanogel", that is a soluble polymer particulate (or perhaps more accurately described as forming a stable, colloidal-like dispersion), is defined as a soluble, porous polymer gel particle having any shape with an equivalent diameter in a range of about 1 nm to about 200 nm, or greater, so long as the particle remains soluble in a target solvent or a monomer composition with which the nanogel is intended to be used. A nanogel is soluble in that it is uniformly dispersible as single discrete macromolecular structures in water, an aqueous solution, the target solvent, or a monomer composition.

Production of Nanogels

Figure 24:
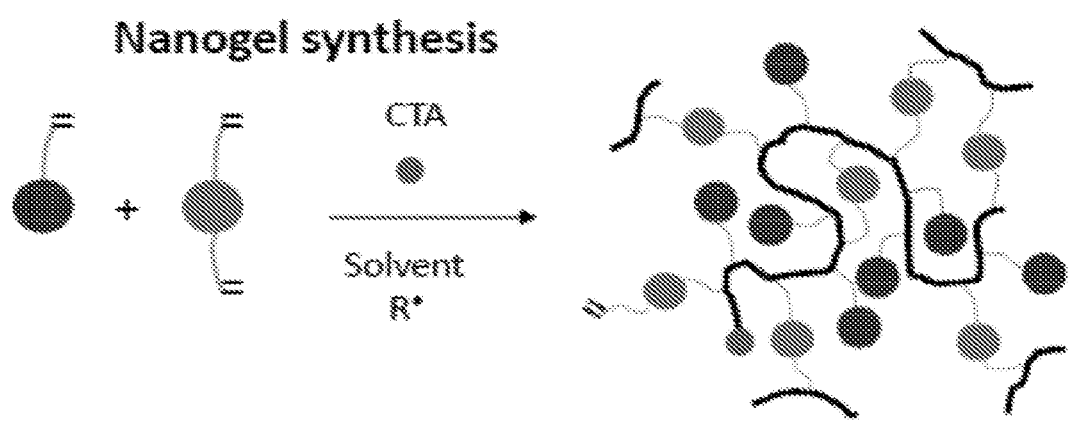
FIG. 24 is a schematic diagram depicting the synthesis of a nanogel.
Figure 25:
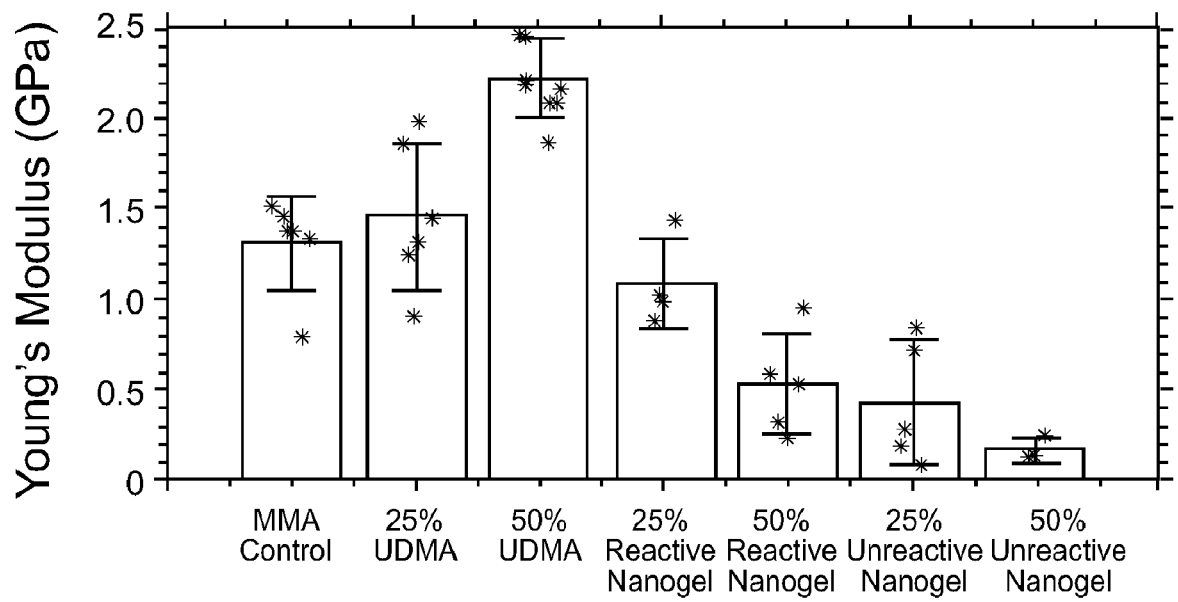
FIG. 25 contains graphs of Young's modulus, maximum strength, percentage of elongation at break, and toughness of the MMA-nanogel formulations along with the MMA-UDMA control networks. The graphs show that the decreasing double-bond concentrations have a significant impact on the mechanical properties of the polymers.
Figure 25:
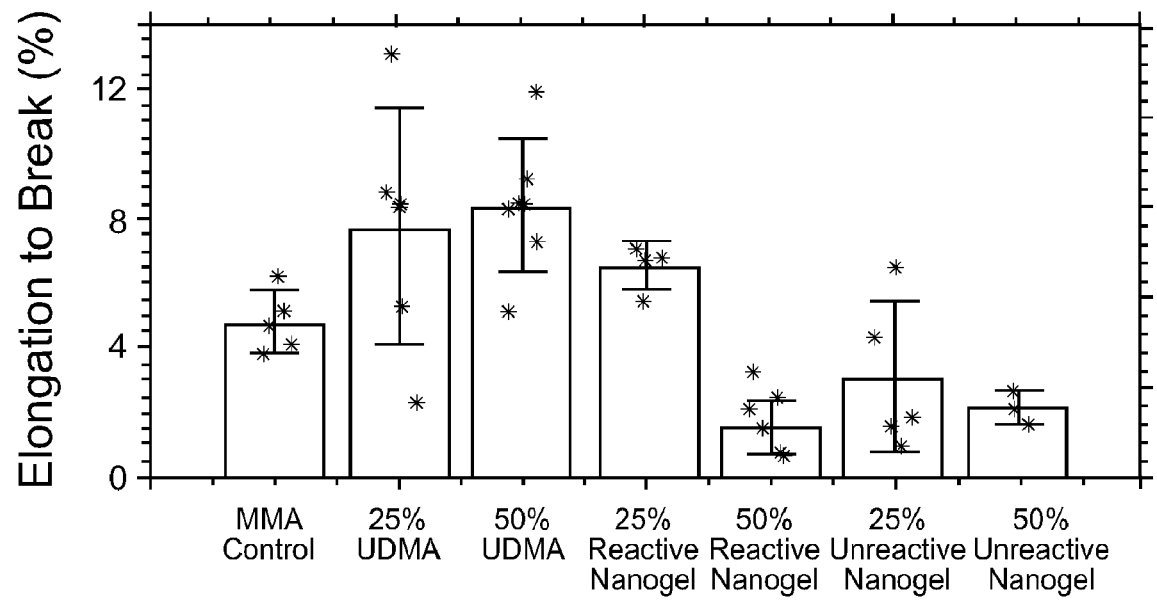
Figure 25:
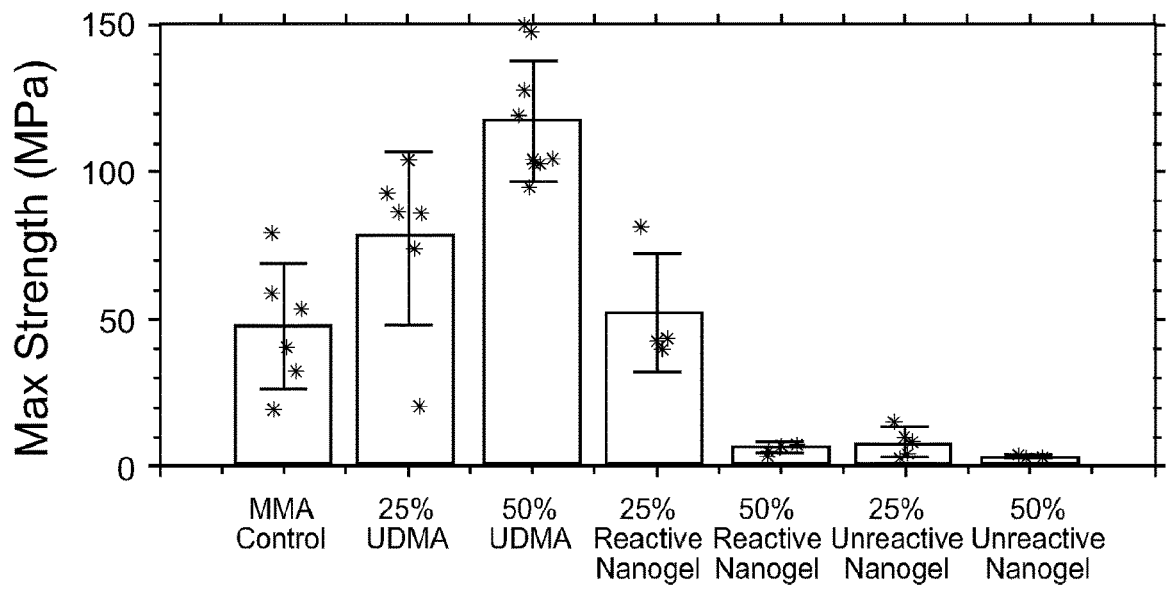
Figure 25:
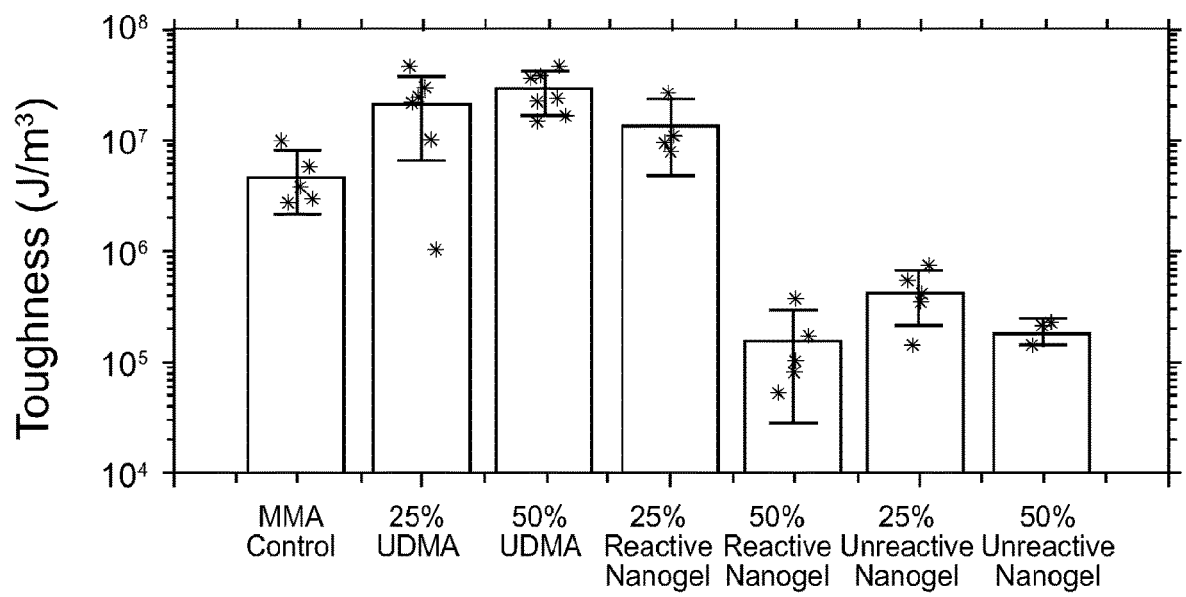

Information regarding nanogels and methods of making nanogels is set forth, for example, in U.S. Pat. No. 9,138,383, which is incorporated herein by reference in its entirety. Additionally, FIG. 24 is a schematic diagram depicting the synthesis of a nanogel.

"Gelation time" is the time to reach the gel point (the point at which a continuous crosslinked network initially develops) during a polymerization.

Monovinyl Monomer

As used herein, a "monovinyl monomer" is a monomer having one polymerizable double bond per molecule. The monovinyl monomer may comprise any monomer which can be polymerized by a free-radical mechanism such as (meth)acrylates and acrylates, styrene and derivatives thereof (styrenics), vinyl acetate, maleic anhydride, itaconic acid, N-alkyl (aryl) maleimides and N-vinyl pyrrolidone, vinyl pyridine, acrylamide, methacrylamide, N,N-di alkyl-methacrylamides and acrylonitrile. Vinyl monomers, such as styrenics, acrylates and (meth)acrylates, (meth)acrylamides and acrylonitrile are preferred monomers. Mixtures of more than one monovinyl monomer may be used.

Examples of suitable acrylate monomers include alkyl acrylates such as methyl acrylate and ethylacrylate (EA). Examples of suitable monovinyl (meth)acrylate monomers include $C_1$-$C_{20}$ alkyl(meth)acrylates, preferably $C_1$-$C_8$, and more preferably $C_1$-$C_4$, such as, for example, methyl(meth)acrylate, ethyl(meth)acrylate (EMA), propyl(meth)acrylate, n-butyl(meth)acrylate, iso-butyl(meth)acrylate, t-butyl (meth)acrylate, 2-ethylhexyl(meth)acrylate octyl (meth)acrylate, dodecyl(meth)acrylate, isodecyl methacrylate (IDMA), ethoxylated bisphenol A diacrylate (BPAEDA), isobornyl methacrylate (IBMA), 2-ethylhexyl methacrylate (EHMA), butyl methacrylate (BMA), and ethyl methacrylate (EMA), hybrid acrylate/methacrylate prepared by the reaction of hydroxyethyl acrylate and isocyanatoethyl methacrylate (HEA+IEM).

Examples also include (meth)acrylamide monovinyl monomers. Other suitable monovinyl monomers include aromatic (meth)acrylates. These include, but are not limited to, 2-phenoxyethyl (meth)acrylate, phenyl (meth)acrylate, p-t-butylphenyl (meth)acrylate, p-methoxyphenyl (meth) acrylate, (meth)acrylate, p-cyclohexylphenyl (meth)acrylate, p-nitophenyl (meth)acrylate, and benzoyl (meth)acrylate. Also suitable are polycyclicaromatic (meth)acrylates such as 2-napthyl (meth)acrylate. In addition, (meth)acrylic acid is a suitable monovinyl monomer.

As used herein, a "functional monomer" is a monomer having one or more additional reactive groups available for further polymerization or reaction of the nanogel particles. Such monomers include methacrylic acid and acrylic acid or other —COOH containing monomers (these embodiments are particularly suited for use with dental adhesives, sealants, and other dental materials); hydroxy alkyl acrylates such as hydroxy ethylacrylate (HEA); hydroxy alkyl (meth) acrylates such as hydroxyethyl(meth)acrylate (HEMA), polyethoxy ethyl methacrylate, hydroxypropyl(meth)acrylate and hydroxybutyl (meth)acrylate; oxirane containing (meth)acrylates (epoxy (meth)acrylates) such as glycidyl (meth)acrylate, and dialkyl aminoalkyl(meth)acrylates such as dimethylaminoethyl(meth)acrylate, diethylaminoethyl (meth)acrylate, dimethyl aminopropyl(meth)acrylate and diethyl aminopropyl(meth)acrylate; and norbornyl (meth) acrylate.

In one aspect, water dispersible nanogels are prepared in a single stage by utilizing a hydrophilic monomer composition comprising a functional monomer that is selected from a poly(ethylene glycol) mono(meth)acrylate, polyethoxy ethyl methacrylate (EHEMA), and (meth)acrylamide.

In a particular aspect, the water dispersible nanogel is prepared in a single stage by employing 50 mol % to 90 mol % EHEMA compared to the mols of total monomer in the composition.

In one preferred aspect, polyethoxy (10) ethyl methacrylate (El 0 HEMA, HEMA 10) is employed as a hydrophilic monomer.

As used herein, a reactive olefinic compound contains at least one olefinic group and at least one additional reactive functional group such as a halogen, isocyanato or anhydride group. Exemplary reactive olefinic compounds include, but are not limited to, (meth)acryloyl chloride, (meth)acrylic anhydride, (meth)acrylic acid, isocyanatoalkyl(meth)acrylate, isocyanatoethyl(meth)acrylate vinylbenzene chloride, chloroethyl vinyl ether, allyl chloride and isocyanatomethyl (meth)acrylate.

Unless otherwise specified or implied, the term "(meth) acrylate" includes both the (meth)acrylate ($CH_2=C(CH3)C(=O)-$), also known as methacrylate, and the analogous acrylate ($CH_2=CHC(=O)-$).

Divinyl Monomer

As used herein, a "divinyl monomer" is a monomer having two polymerizable double bonds per molecule. Examples of suitable divinyl monomers include: ethylene glycoldi(meth)acrylate, urethane dimethacrylate (UDMA), tetraethyleneglycoldi(meth)acrylate (TTEGDMA), the condensation product of bisphenol A and glycidyl (meth)acrylate, 2,2'-bis [4-(3-methacryloxy-2-hydroxy propoxy)-phenyl] propane (bis-GMA), ethoxylated bisphenol-A-di(meth) acrylate (BisEMA), hexanediol di(meth)acrylate, polyethyleneglycol dimethacrylate, tripropylene glycol di(meth)acrylate, butanediol di(meth)acrylate, neopentyl glycol di(meth)acrylate, diethylene glycol di(meth)acrylate, triethylene glycol di(meth)acrylate, dipropylene glycol di(meth)acrylate, allyl (meth)acrylate, divinyl benzene, and 1,3-diglycerolatediacrylate and derivatives thereof. A bis (meth)acrylamide, such as N,N-methylene bisacrylamide, could also be used as the divinyl component. Optionally, the divinyl monomer may comprise a mixture of more than one divinyl compound.

The branched polymer may also be formed using a reactive oligomer or reactive polymer or pre-polymer having at least two double bonds per molecule which are polymerizable via a free-radical mechanism as the, or one of the, divinyl monomers. Typical reactive oligomers include, but are not limited to, epoxy-(meth)acrylates, polyether(meth) acrylates, polyester-(meth)acrylates and urethane-(meth) acrylates. Typical reactive polymers include addition or condensation polymers such as a styrene or acrylic copolymers containing pendant polymerizable (meth)acrylate groups or unsaturated polyesters. The molecular weight range of the oligomer or reactive polymer may vary from 500-500,000 g/mole or more preferably from about 5,000 to 10,000 MW. In addition, trivinyl monomer successfully has been used as the crosslinker (trimethylolpropane tri(meth) acrylate). It is anticipated that tri-, tetra, and multi-(meth) acrylates are suitable in embodiments of the present invention. However, the avoidance of macrogelation is anticipated to be more of a problem with these compounds.

The divinyl or multivinyl monomer component can be selected such that the crosslinks formed within the nanogel can be intentionally reversible. By incorporation of a hydrolytically labile linkage or linkages that connect the polymerizable groups in the crosslinking monomer, the initially formed covalent crosslinks in the resultant polymer subsequently can be cleaved in a controllable manner by exposure of the nanogel particle to moisture. The outcome is that the crosslinked nanogel particle can be degraded to individual linear polymeric chains with molecular weight controlled based primarily on the chain transfer agent used in the nanogel synthesis. Other than the hydrolytic degradation mechanism, alternate degradable crosslinkers could be designed to degrade in response to temperature, pH, light, enzyme or other approaches.

Synthetic polymers have a distribution of molecular weights (MW, grams/mole). Polydispersity describes a polymer consisting of molecules with a variety of chain lengths and molecular weights. The width of a polymer's molecular weight distribution is estimated by calculating its polydispersity, Mw/Mn. The closer this approaches a value of 1, the narrower is the polymer's molecular weight distribution. The weight-average molecular weight (Mw) is the average molecular weight of a polydisperse polymer sample, averaged to give higher statistical weight to larger molecules; calculated as Mw=SUM($Mi^2Ni$)/SUM(Mi Ni). One technique used to measure molecular weights of polymers is light scattering. A light shining through a very dilute solution of a polymer is scattered by the polymer molecules. The scattering intensity at any given angle is a function of the second power of the molecular weight. Consequently, because of this "square" function, large molecules will contribute much more to the molecular weight that we calculate than small molecules.

The number-average molecular weight (Mn) is the average molecular weight of a polydispersed polymer sample, averaged to give equal statistical weight to each molecule; calculated as Mn=SUM(Mi Ni)/SUM(Ni).

The hydrodynamic radius is the radius of a particle or polymer molecule in solution that is determined from a measurement of mobility or diffusion, for example, in viscosity or dynamic light scattering experiments. The diffusion coefficient, D is related to the viscosity and the hydrodynamic radius, $R_H$ by: $D=k_B T/6\pi \eta R_H$; where $k_B$ is the Boltzmann constant and T is the absolute temperature.

Nanogel Compositions

The copolymerization of monovinyl and multivinyl monomers typically leads to macroscopically crosslinked polymeric networks, which are often referred to as macrogels. At a very early stage of these crosslinking polymerizations, the continuous network structure is formed and the polymer is becomes insoluble in all solvents. Embodiments of the present invention provide methods for controlling the polymerization process through use of chain transfer agents to yield shorter polymer chains that either delay macrogelation significantly or avoid it altogether, even at high degrees of monomer conversion. In one aspect, the molecular weight of the nanogel increases as the amount of chain transfer agent decreases. The resulting nanogel, which has internal cyclized and crosslinked structure but lacks macroscopic connectivity between the discrete particles, is soluble in appropriate solvents.

Nanogels can be approximated as dendritic or hyperbranched polymers since they can have continuously branching, connected structures. In network forming free radical chain polymerizations, the transient nanogel stage, which precedes macrogelation, is indicative of heterogeneous polymerization processes involving cyclization reactions and differential reactivities of free and pendant vinyl groups. Nanogels arise in di- or multi-vinyl polymerizations or in copolymerizations of these multifunctional monomers with monovinyl monomers. The incorporation of divinyl monomers in a polymerization generally results in crosslinked polymer formation. Crosslinked or macrogel polymers are by definition infinite molecular weight structures that are insoluble in any solvent. Macrogel polymers exist when the average number of crosslinks per chain exceeds two. In monovinyl/divinyl copolymerizations, the critical conversion (pc) at which gelation occurs can be predicted. In practice, the observed gel points are usually higher than the theoretical calculations because of cyclization reactions that decrease the so productive crosslink density. A chain transfer agent is required to controllably limit the length of the propagating chain such that bridging between growing nanogel regions is eliminated and the resulting high molecular weight polymeric nanogels are soluble.

According to the present invention, higher concentrations of the divinyl monomer can be used-up to the limit of exclusively using a divinyl monomer in the nanogel synthesis. This provides a unique method to use conventional free radical polymerization chemistry and conventional (meth) acrylate monomers to produce hyperbranched polymeric structures.

The polymerization of the monomer mixture may be performed using any free-radical polymerization method, e.g., solution, suspension, emulsion and bulk polymerization methods may all be used. For many applications of the branched polymers of the invention, the material is required in solid form. For these applications, polymers made by solution polymerization require the solvent to be removed before use. This increases the cost and it is difficult to remove all of the solvent providing deficiencies in utilization of the polymer. Alternatively when the polymer is required for use in solution form, it is necessary to conduct the polymerization in the solvent which is to be present in the end-use application if the step of isolating the polymer is to be avoided. Therefore it may be advantageous to produce the branched polymer by a non-solution method, e.g. suspension or bulk polymerization.

Chain Transfer Agent

A "chain transfer agent" is an intentionally added compound that terminates the growth of one polymer chain and then reinitiates polymerization to create a new chain. A chain transfer agent is used as a way to limit chain length.

In an embodiment, the chain transfer agent is selected from among alkyl thiols, aryl thiols, monovinyl thiols, divinyl thiols, difunctional thiols, trifunctional thiols, tetrafunctional thiols, pentafunctional thiols, hexafunctional thiols, octafunctional thiols, and bis(borondifluorodimethylglyoximate) cobaltate (II).

In an embodiment, the chain transfer agent is selected from propyl mercaptan, butyl mercaptan, hexyl mercaptan, octyl mercaptan, dodecanethiol, thioglycolic acid, methylbenzenethiol, dodecanethiol, mercaptopropionic acid, 2-ethyl hexyl thioglycolate, octylthioglycolate, mercaptoethanol, mercaptoundecanoic acid, thiolactic acid, thiobutyric acid, trimethylol propane tris(3-mercaptopropionate), pentaerythritol tetra(3-mercaptopropionate), pentaerythritol tetrathioglycolate, pentaerythritol tetrathiolactate, pentaerythritol tetrathiobutyrate; dipentaerythritol hexa(3-mercaptopropionate), dipentaerythritol hexathioglycolate; tripentaerythritol octa(3-mercaptopropionate), tripentaerythritol octathioglycolate and cysteine.

In an embodiment, the chain transfer agent is selected from 1-dodecanethiol and mercaptoethanol (ME).

In an embodiment, the chain transfer agent is a difunctional chain transfer agent is selected from mercaptoethanol, mercaptopropanol, 3-mercapto-2-butanol, 2-mercapto-3-butanol, 3-mercapto-2-methyl-butan-1-ol, 3-mercapto-3-methyl-hexan-1-ol, 3-mercaptohexanol and 3-mercaptopropionic acid.

In an embodiment, nanogels are prepared with mercaptoethanol (15 mol %) as chain transfer agent.

The chain transfer agent may be chosen from a range of thiol compounds including monofunctional and multifunctional thiols. Monofunctional thiols include, but are not limited to, propyl mercaptan, butyl mercaptan, hexyl mercaptan, octyl mercaptan, dodecyl mercaptan (docecanethiol, DDT), thioglycolic acid, methylbenzenethiol, dodecanethiol, mercaptopropionic acid, alkyl thioglycolates e.g. 2-ethyl hexyl thioglycolate or octylthioglycolate, mercaptoethanol, mercaptoundecanoic acid, thiolactic acid, thiobutyric acid. Multifunctional thiols include trifunctional compounds such as trimethylol propane tris(3-mercaptopropionate), tetrafunctional compounds such as pentaerythritol tetra(3-mercaptopropionate), pentaerythritol tetrathioglycolate, pentaerythritol tetrathiolactate, pentaerythritol tetrathiobutyrate; hexafunctional compounds such as dipentaerythritol hexa(3-mercaptopropionate), dipentaerythritol hexathioglycolate; octafunctional thiols such as tripentaerythritol octa(3-mercaptopropionate), tripentaerythritol octathioglycolate. The use of multifunctional thiols is a useful way to increase the degree of branching in the polymer. A difunctional chain transfer agent contains at least one thiol and at least one hydroxyl group. Examples of difunctional chain transfer agents include mercaptoethanol, mercaptopropanol, 3-mercapto-2-butanol, 2-mercapto-3-butanol, 3-mercapto-2-methyl-butan-1-oh, 3-mercapto-3-methyl-hexan-1-ol and 3-mercaptohexanol. Optionally, the chain transfer agent may comprise a mixture of more than one type of compound.

The amount of chain transfer agent present may be up to 50 wt % of the total initial monomer concentration. In a first embodiment, the amount of chain transfer agent present is 0.1-20% w/w, e.g. 0.5-10% w/w based on total monomer in the monomer mixture. The branched polymer is made using an appropriate amount of chain transfer agent to prevent the formation of a substantial amount of insoluble cross-linked polymer. The majority of the polymer produced is soluble, even at high conversion of monomer to polymer. A small amount of cross-linked polymer may be formed but the reaction conditions and level of chain transfer agent should preferably be chosen such that the amount of cross-linked polymer formed is at most about <10% (w/w), more preferably about <5% (w/w), more preferably about <2.5% (w/w) and optimally about 0% (w/w). For certain polymerization systems, the use of secondary mercaptan chain transfer agents may be preferred. Chain transfer agents comprising secondary mercaptans are particularly preferred when the polymerization is carried out in bulk or suspension polymerization processes.

Alternative chain transfer agents may be any species known to reduce molecular weight in the conventional free radical polymerization of vinyl monomers. Examples include sulphides, disulphides, halogen-containing species. Also, catalytic chain transfer agents such as cobalt complexes, e.g., cobalt (II) chehates such as cobalt porphyrin compounds are useful chain transfer agents for the invention. Suitable cobalt chehates are known in the art and are described in WO 98/04603. A particularly suitable compound is bis(borondifhuorodimethyhghyoximate) cobaltate (II) also known as CoBF. Catalytic chain transfer agents may be used in relatively low concentrations compared to conventional thiol chain transfer agents, e.g. <0.5% preferably <0.1% by weight (on monovinyl monomer), since they are generally highly effective at low concentrations.

Initiator

The polymerization of the monomers may be initiated by any suitable method of generating free-radicals such as by thermally induced decomposition of a thermal initiator such as an azo compound, peroxide or peroxyester. Alternatively, redox initiation or photo-initiation can be used to generate the reactive free radicals. Therefore the polymerization mixture also preferably contains a polymerization initiator which may be any of those known and conventionally used in free-radical polymerization reactions, e.g. azo initiators such as azobis(isobutyronitrile) (AIBN), azobis(2-methyl-butyronitrile), azobis(2,4-dimethylvaleronitrile), azobis(4-cyanovaleric acid), peroxides such as dilauroyl peroxide, tert-butyl peroxyneodecanoate, dibenzoyl peroxide, cumyl peroxide, tert-butyl peroxy-2-ethyl hexanoate, tert-butyl peroxy diethyl acetate and tert-butyl peroxy benzoate. In a specific aspect, the thermal initiator is AIBN.

In another aspect, the initiator is a redox (reduction-oxidation) pair of initiators. Redox initiator systems use both a primary initiator and a chemical reducing agent. Several types of redox initiator pairs are known such as persulfite-bisulfite, persulfate-thiosulfate, persulfate-formaldehyde sulfoxylate, peroxide-formaldehyde sulfoxylate, peroxide-metallic ion (reduced), persulfate-metallic ion (reduced), benzoyl peroxide-benzene phosphinic acid, and benzoyl peroxide-amine wherein the amine acts as the reducing agent. The redox pair may be selected from any known redox pair such as a combination of benzoyl peroxide and dimethyl-p-toluidine, AMPS (ammonium persulfate) and TEMED (tetramethyl ethylene diamine), sulfur dioxide and ter-butyl hydroperoxide, potassium persulfate and acetone sodium bisulfate. In a specific aspect, the redox initiator pair is 1 wt % benzoyl peroxide with 1.5 wt % dimethyl-p-toluidine amine coinitiator.

In an embodiment, the initiator is a photoinitiator. The photoinitiator can be selected from one or more known photoinitiators. For example, the initiator can be selected from one or more of an alpha-hydroxyketone, an acyl phosphine oxide, a benzoyl peroxide with or without an amine co-initiator. Any known photoinitiator, or combination of one or more photoinitiators can be employed. For example, the photoinitiator can be selected from one or more acyl phosphine oxides such as BAPO (bis-acylphosphine oxide), phenyl-bis(2,4,6-trimethylbenzoyl)phosphine oxide, TPO (2,4,6-trimethylbenzolyldiphenylphosphine oxide), bis-trimethoxybenzoyl-phenylphosphine oxide, TPO-L (2,4, 6-trimethylbenzoylphenyl phosphinate), or MAPO(tris[1-(2-methyl)aziridinyl]phosphine oxide. Other photoinitiators may be employed alone or in combination including, but not limited to, DMPA (2,2-dimethoxy-2-phenylacetophenone), BDK (benzil dimethylketal), CPK (cyclohexylphenylketone), HDMAP (2-hydroxy-2-methyl-1-phenyl propanone), ITX (isopropylthioxanthrone), HMPP (hydroxyethyl-substituted alpha-hydroxyketone), MMMP (2-methyl-4'-(methylthio)-2-morpholinopropiophenone), BDMB (2-benzil-2-dimethylamino-1-(4-morpholinophenyl)-butanone-1), BP (Benzophenone), TPMK (methylthiophenyl-morpholinoketone), 4-Methylbenzophenone, 2-Methylbenzophenone, 1-Hydroxy cyclohexyl phenyl ketone, 2-Benzyl-2-(dimethylamino)-144-(4-morpholinyl)phenyl]-1-butanone, Diphenyl Iodonium Hexafluorophosphate, Bis (p-tolyl) iodonium hexafluorophosphate, 2-Methyl-1[4-(methylthio)phenyl]-2-morpholinopropanone-1, 2-Hydroxy-2-methyl-phenyl-propan-1-one, 1,7-bis(9-acridinyl)heptane, 2-Hydroxy-4'-hydroxyethoxy-2-methylpropiophenone, 2,2$^1$-Bis(0-chlorophenyl-4,4',5,'-tetraphenyl-1,2'-diimidazole, 9-Phenylacridine, N-phenylglycine, 2-(4-methoxyphenyl-4, 6-bis(trichloromethyl)-1,3,5-triazine, P-toluene sulfonylamine, Tris-(4-dimethylaminophenyl)methane, Tribromo methyl phenyl sulfone, 2,4-Bis(trichloromethyl)-6-(p-methoxy)styryl-s-triazine, 2,4-Bis(trichloromethyl)-6-(3,4-dimethoxy)styryl-s-triazine, 4-(2-aminoethoxy)methyl benzophenone, 4-(2-hydroxyethoxy)methyl benzophenone, 2-Isopropylthioxanthone, 4-Isopropylthioxanthone, 4-Hydroxy benzophenone, 4-Methyl acetophenone, 4-(4-Methylphenylthiophenyl)-phenylmethanone, dimethoxyphenylacetophenone, camphorquinone, 1-Chloro-4-propoxythioxanthone, 2-Chlorothioxanthone, 2,2-Diethoxyacetophenone, 2,4-Diethylthioxanthone, 2-Dimethyl-aminoethylbenzoate, 2-Ethylhexyl-4-dimethylaminobenzoate, Ethyl-4-(dimethylamino) benzoate, 2-Isopropylthioxanthone, Methyl o-benzoyl benzoate, Methyl phenyl glyoxylate, 4,4'-Bis(diethylamino) benzophenone, 4-Phenylbenzophenone, 2,4,6- and Ethyl (2,4,6-trimethylbenzoyl) phenylphosphinate.

The polymerization photoinitiators are used in amounts effective to initiate polymerization in the presence of the curing radiation, typically about 0.01 to about 10 wt %, and more specifically about 0.05 to about 7 wt %, and more specifically, about 0.1 to about 5 wt %, based on the total weight of the composition.

The photoinitiator composition can optionally further contain a coinitiator for example, EHA (2-ethyl hexylacrylate) or an amine coinitiator such as, for example, ethyl-4-(dimethylamino)benzoate, 2-ethylhexyl dimethylaminobenzoate, dimethylaminoethyl (meth)acrylate, or the like. Reactive amine polymerization coinitiators can be used, such as the coinitiator CN386 (a reactive amine adduct of tripropylene glycol diacrylate), commercially available from Sartomer, Darocure EHA, or commercially available from Ciba, and the like. The coinitiator can be present in the composition in an amount of about 0.25 to about 20 wt %, specifically about 1 to about 10 wt %, and more specifically about 1 to about 5 wt %, based on the total weight of the composition. In a specific aspect the initiator is BAPO bis-acyl phosphine oxide commercially available, for example, as Irgacure from Ciba.

Exemplary Attributes of A Nanogel

Globular spherical structure; Short chains/many chain-ends; High internal branching; Swellable network; 104-106 g/mol; ~10 nm swollen diameter.

Nanogel Loading in Base Monomer

Adjustable from dispersed 5-10 nm domains to co-continuous or confluent nanogel domain morphologies.

Can also manipulate the differential polymerization kinetics and mechanical properties between phases on the nano-size scale Percolation Threshold is typically at nanogel concentration in a range of about 10 wt % to about 15 wt % of the nanogel-polymer mixture. At concentrations greater than the Percolation Threshold, the dispersed nanogel affects or can even dominate the structure and/or properties of polymeric network, depending upon the nanogel, the base polymer, and the concentration of the nanogel in the mixture. See, e.g., FIG. 8, which shows the structures achieved polymer films formed with 10 wt % and 50 wt % IBMA/UDMA nanogel in MMA, wherein the IBMA/UDMA disperse nanogels had a swollen diameter of about 20 nm.

The threshold for achieving a Confluent state is typically at a nanogel concentration in a range of about ≥40 wt % of the nanogel-polymer mixture.

Nanogel Swelling

The degree of swelling of a nanogel changes with the dispersant medium (i.e., solvent or polymer).

Figure 9:
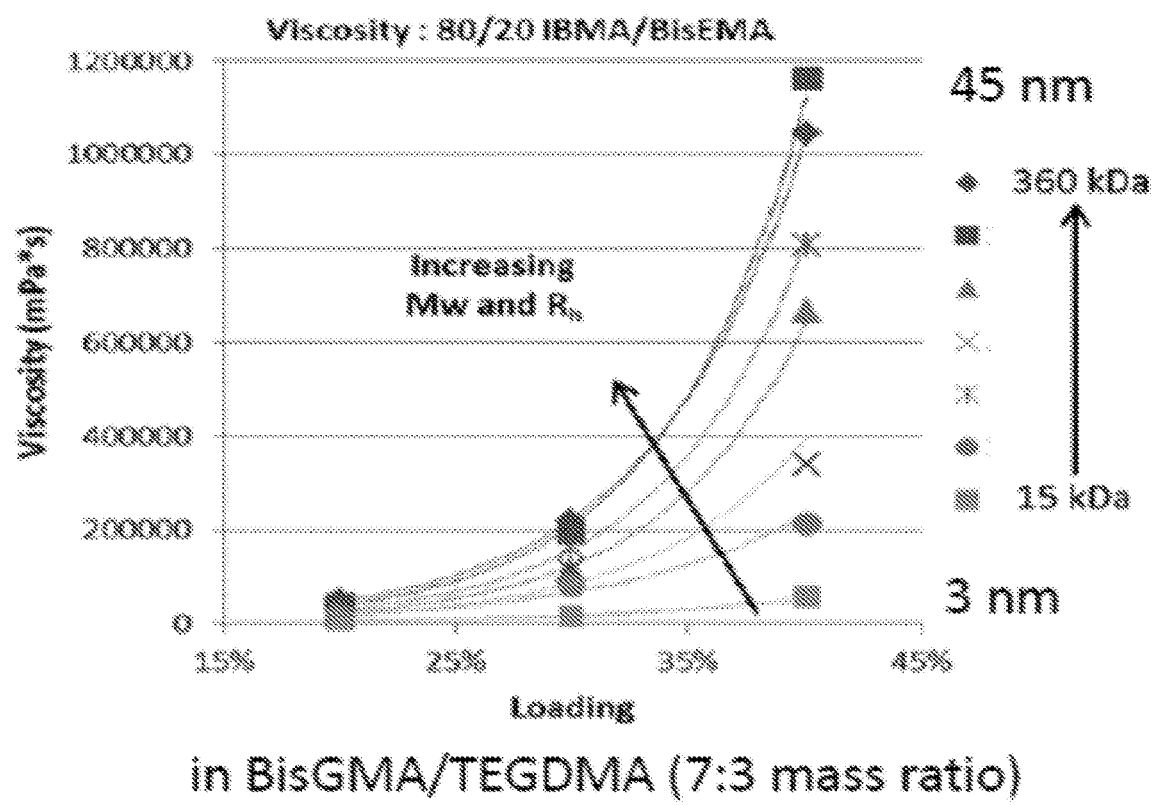
FIG. 9 is a graph showing viscosity of 80/20 IBMA/BisEMA nanogel dispersed in BisGMA/TEGDMA (7:3 mass ratio) as a function of nanogel loading and nanogel size. Increasing resin viscosity is seen as nanogel molecular weight increases.

The viscosity profile as a function of nanogel loading is significantly affected by nanogel size with smaller particles providing reduced impact. See, e.g., FIG. 9. As a result, if it were desirable to produce a mixture with a relatively high degree of nanogel loading, one would be inclined to use a nanogel with a smaller particles size(s).

Nanogel Glass Transition Temperature (Tg)

Figure 10:
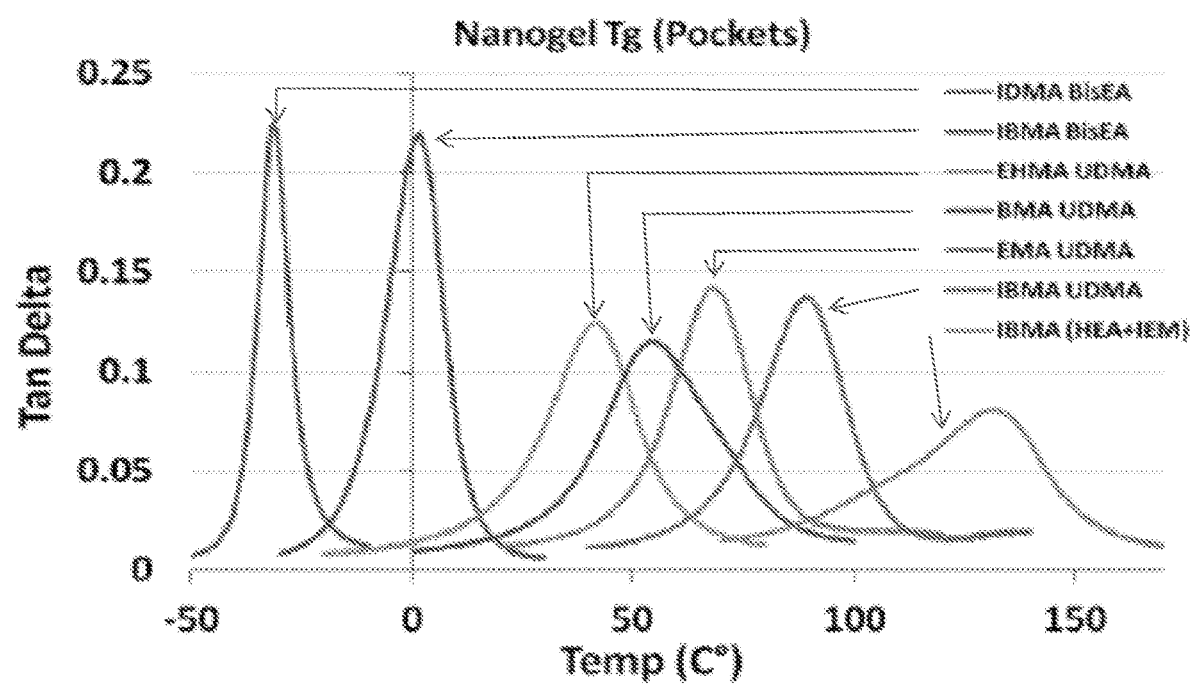
FIG. 10 is graph of glass transition temperatures (Tg) of various nanogel compositions. Monomers used in nanogel synthesis: isodecyl methacrylate (IDMA), ethoxylated bisphenol a diacrylate (BisEA), isobornyl methacrylate (IBMA), ethyl hexyl methacrylate (EHMA), urethane dimethacrylate (UDMA), butyl methacrylate (BMA), ethyl methacrylate (EMA), hydroxyethyl acrylate+isocyanatoethyl methacrylate (HEA+IEM).
Figure 11:
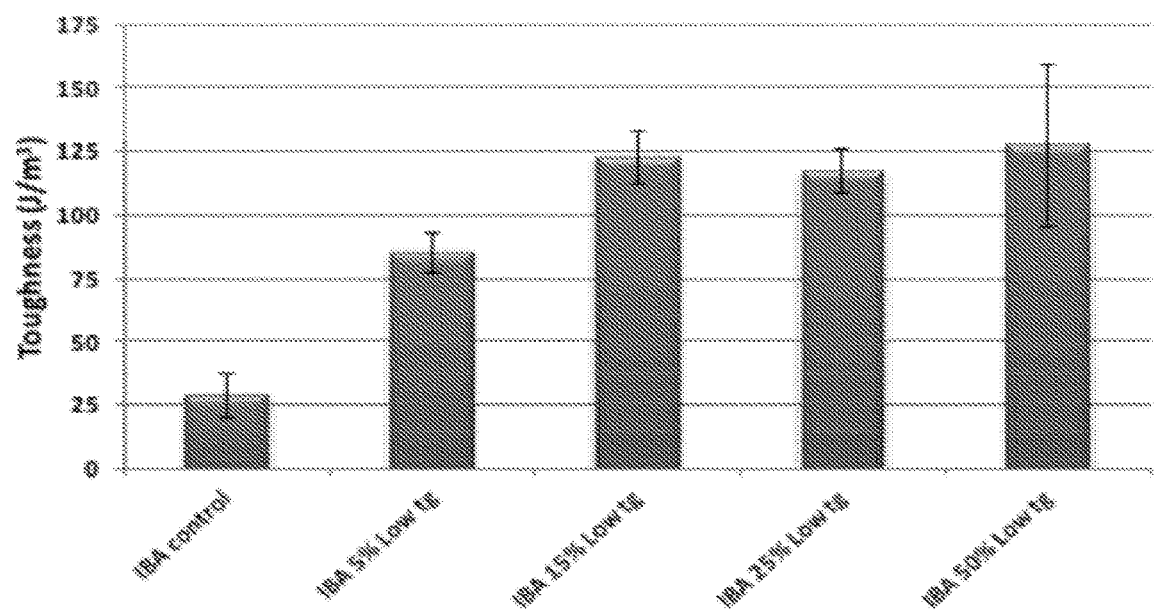
FIG. 11 is a graph of polymer toughness for a low Tg nanogel (IBMA/BisEA at a 1:1 ratio having a Tg of −15° C.) in a high Tg polymer matrix (isobornyl acrylate monomer having a Tg of ~85-95° C.) as function of nanogel loading. Average toughness for control and low-Tg-nanogel-modified linear polymer; increasing toughness is seen with increasing nanogel concentration (wt %).
Figure 12:
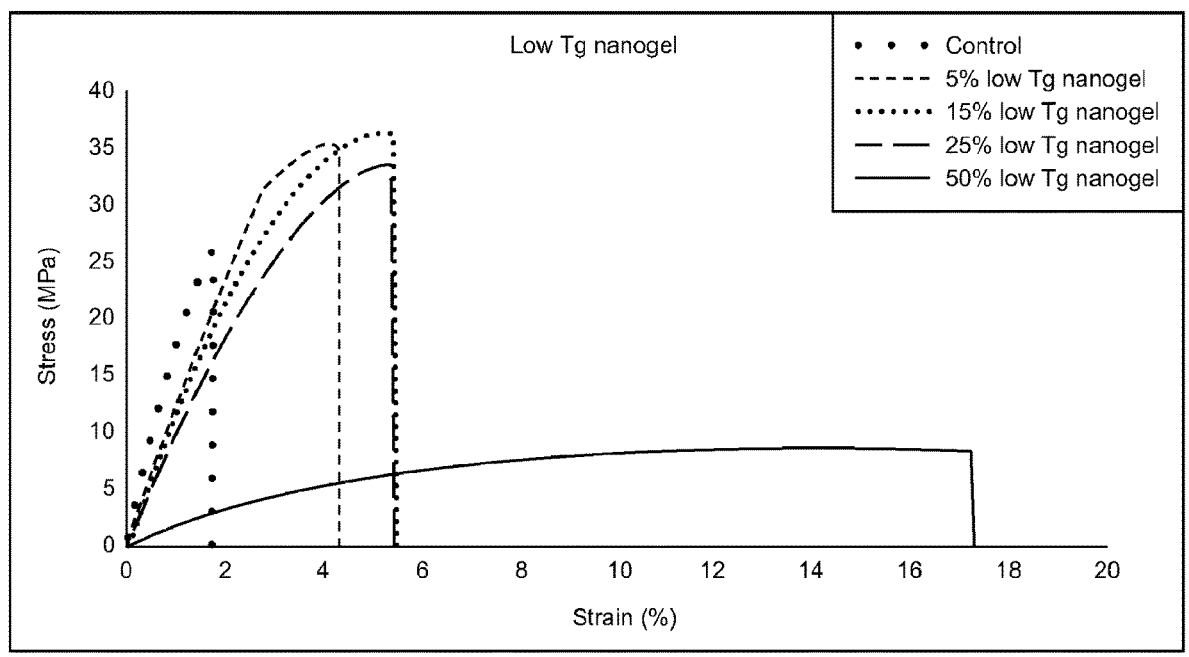
FIG. 12 is a stress-strain graph for a low Tg nanogel (IBMA/BisEA at a 1:1 ratio having a Tg of −15° C.) in a high Tg polymer matrix (isobornyl acrylate monomer having a Tg of ~85-95° C.) as function of nanogel loading. Mechanical testing (MTS): 3-point bending, 1 mm/min crosshead speed, sample dimensions: 2 mm×2 mm×25 mm.
Figure 13:
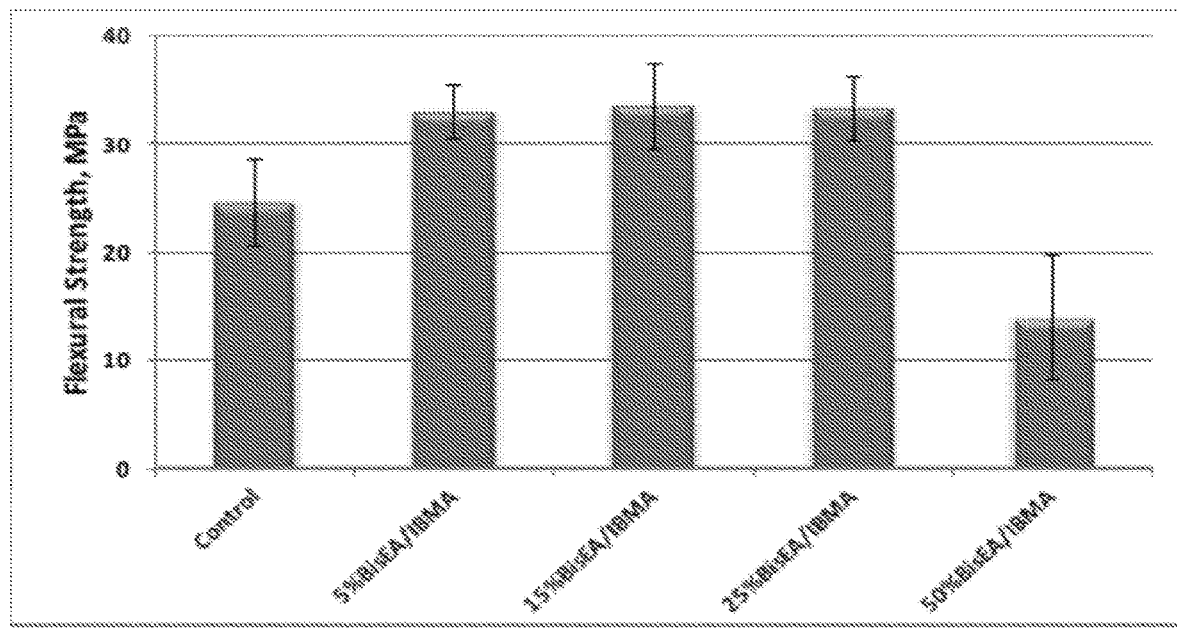
FIG. 13 is a graph of average flexural strength for a low Tg nanogel (IBMA/BisEA at a 1:1 ratio having a Tg of −15° C.) in a high Tg polymer matrix (isobornyl acrylate monomer having a Tg of ~85-95° C.) as function of nanogel loading.
Figure 14:
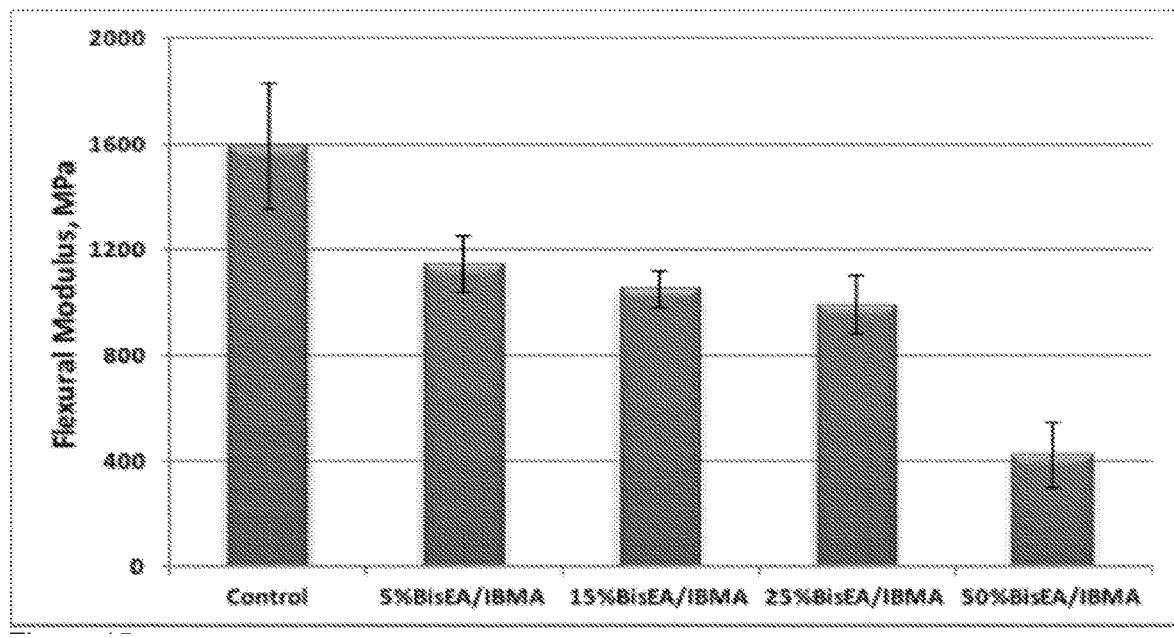
FIG. 14 is a graph of average flexural modulus for a low Tg nanogel (IBMA/BisEA at a 1:1 ratio having a Tg of −15° C.) in a high Tg polymer matrix (isobornyl acrylate monomer having a Tg of ~85-95° C.) as function of nanogel loading. Increasing concentration of low Tg nanogel resulted in flexural modulus reduction.
Figure 15:
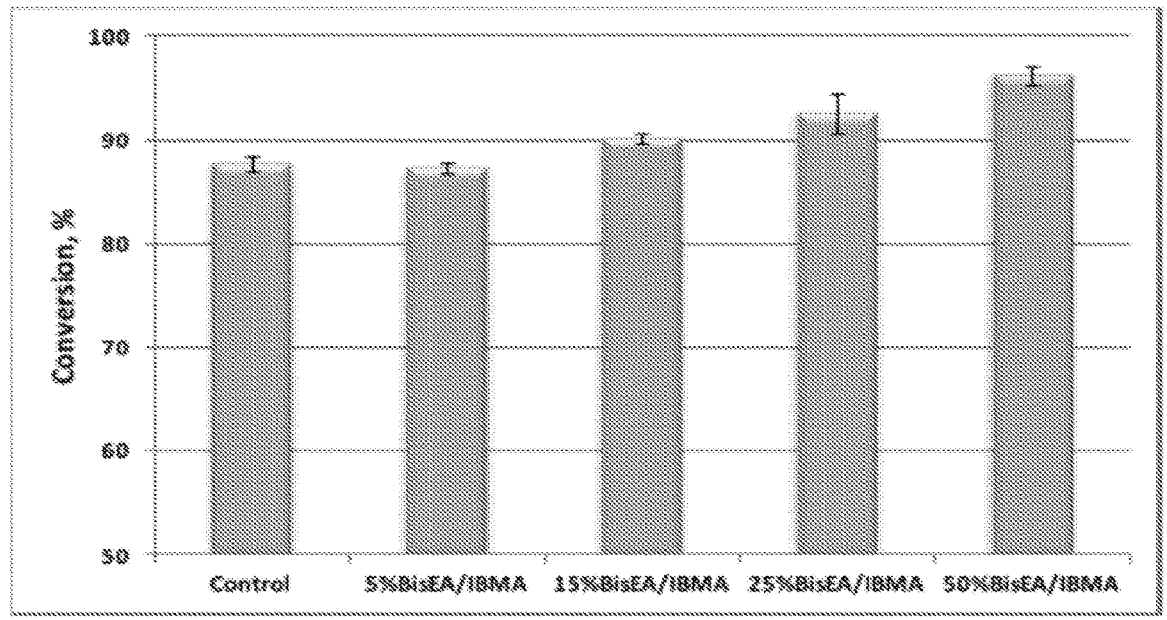
FIG. 15 is a graph of the conversion percentage for a low Tg nanogel (IBMA/BisEA at a 1:1 ratio having a Tg of −15° C.) in a high Tg polymer matrix (isobornyl acrylate monomer having a Tg of ~85-95° C.) as function of nanogel loading. Increasing concentration of low Tg nanogel resulted in an increase in overall conversion.
Figure 16:
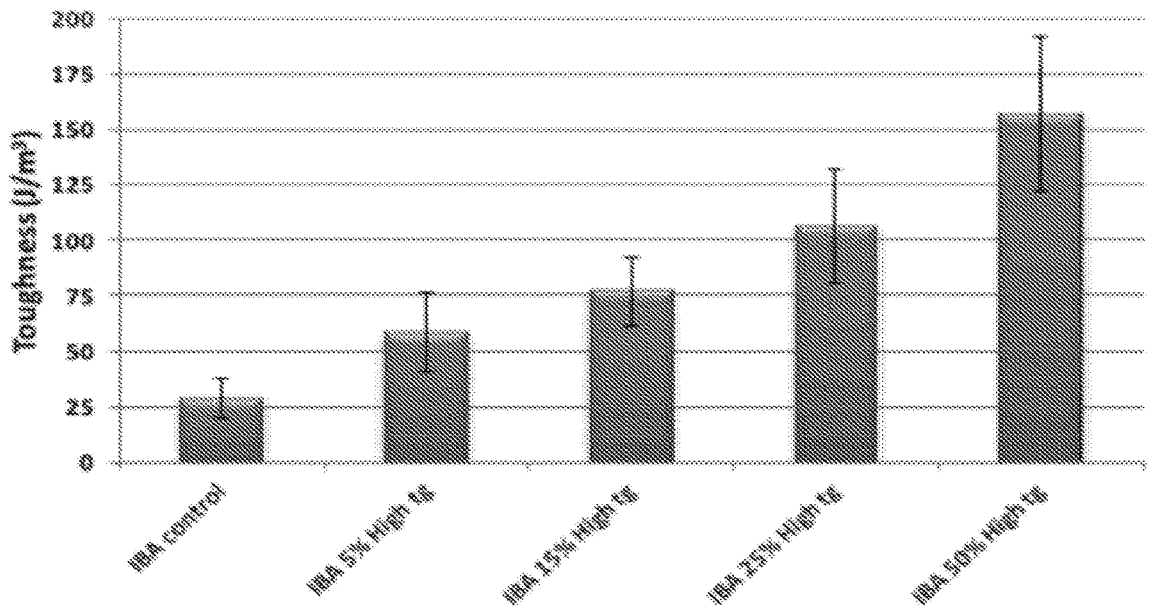
FIG. 16 is a graph of polymer toughness for a high Tg nanogel (IBMA/UDMA at a 7:3 ratio having a Tg of 80° C.) in a high Tg polymer matrix (isobornyl acrylate monomer having a Tg of ~85-95° C.) as a function of nanogel loading. Increasing toughness is seen with increasing nanogel concentration (wt %).
Figure 17:
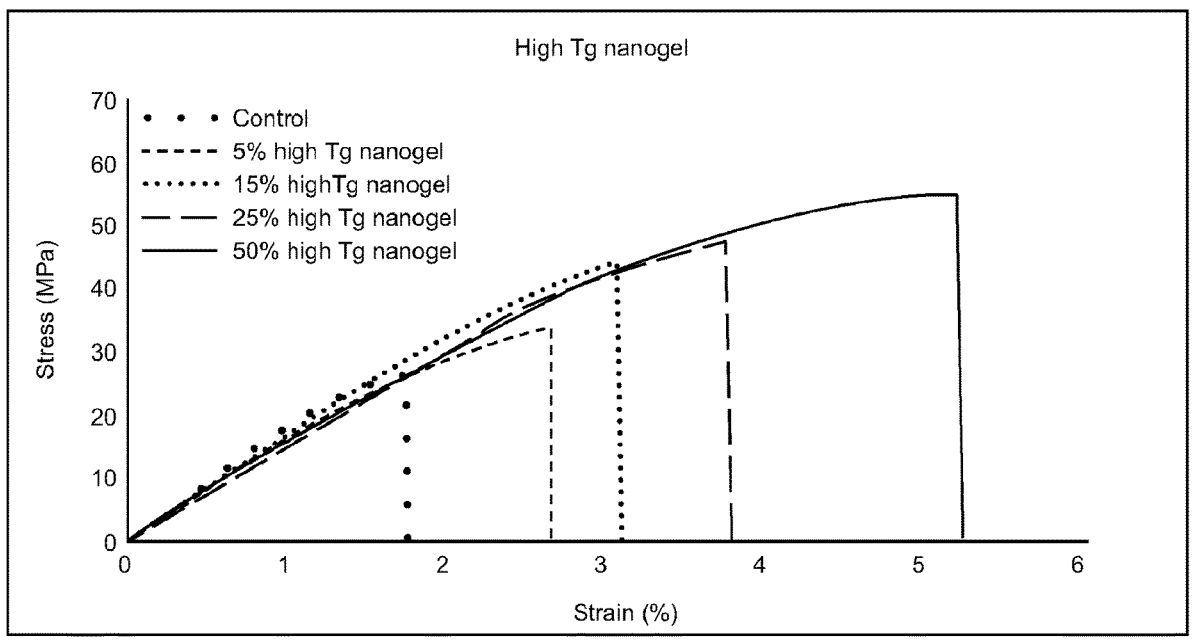
FIG. 17 is a stress-strain graph for a high Tg nanogel (IBMA/UDMA at a 7:3 ratio having a Tg of 80° C.) in a high Tg polymer matrix (isobornyl acrylate monomer having a Tg of ~85-95° C.) as a function of nanogel loading. Mechanical testing (MTS): 3-point bending, 1 mm/min crosshead speed, sample dimensions: 2 mm×2 mm×25 mm.
Figure 18:
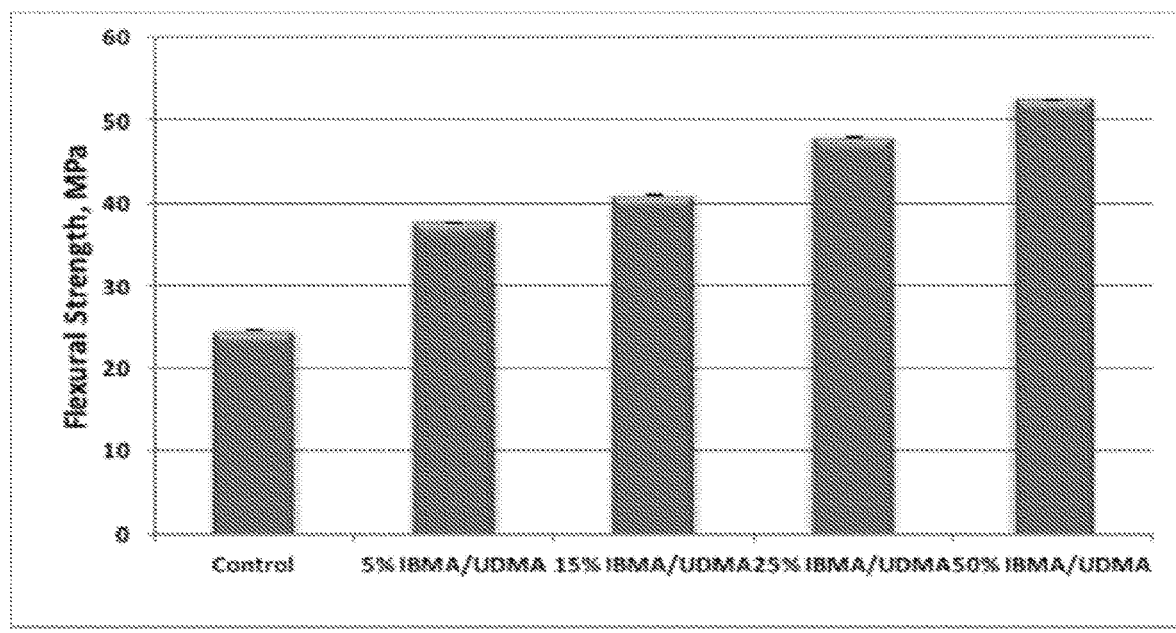
FIG. 18 is a graph of average flexural strength for a high Tg nanogel (IBMA/UDMA at a 7:3 ratio having a Tg of 80° C.) in a high Tg polymer matrix (isobornyl acrylate monomer having a Tg of ~85-95° C.) as a function of nanogel loading.
Figure 19:
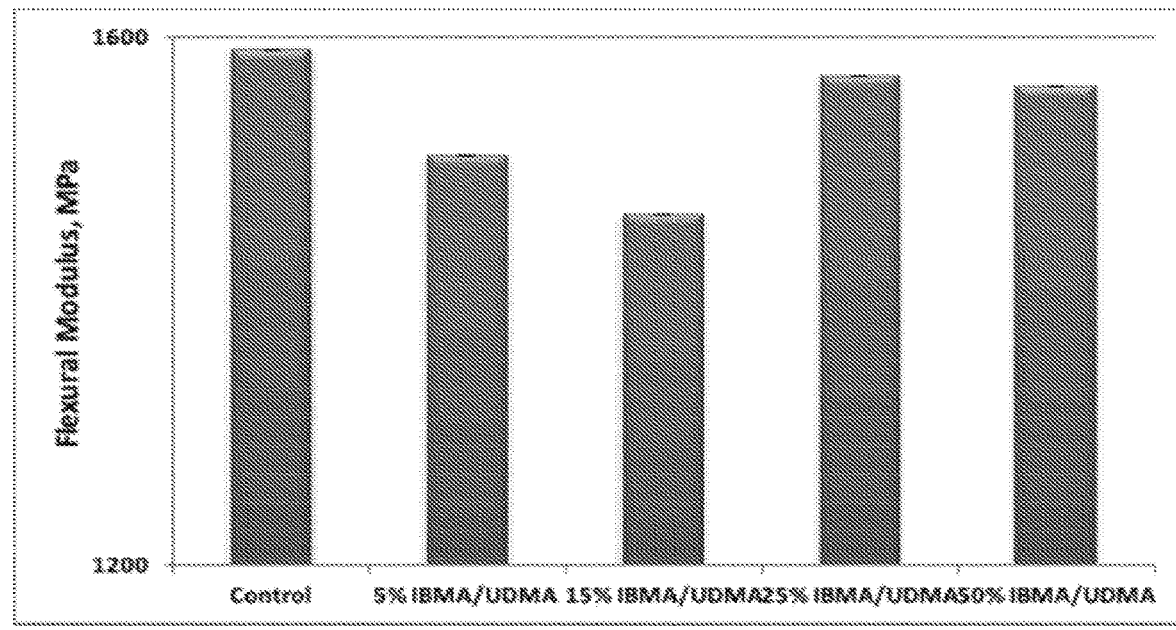
FIG. 19 is a graph of average flexural modulus for a high Tg nanogel (IBMA/UDMA at a 7:3 ratio having a Tg of 80° C.) in a high Tg polymer matrix (isobornyl acrylate monomer having a Tg of ~85-95° C.) as a function of nanogel loading.
Figure 20:
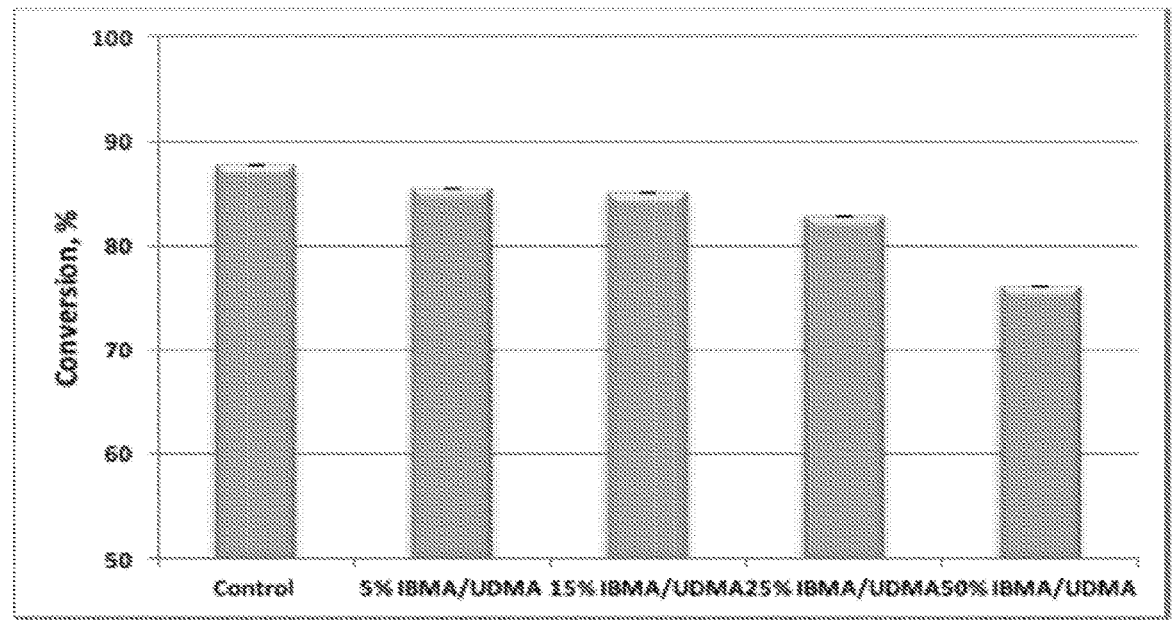
FIG. 20 is a graph of the average final percentage of conversion for a high Tg nanogel (IBMA/UDMA at a 7:3 ratio having a Tg of 80° C.) in a high Tg polymer matrix (isobornyl acrylate monomer having a Tg of ~85-95° C.) as a function of nanogel loading. Increasing concentration of low Tg nanogel results in a decrease in overall conversion.
Figure 21:
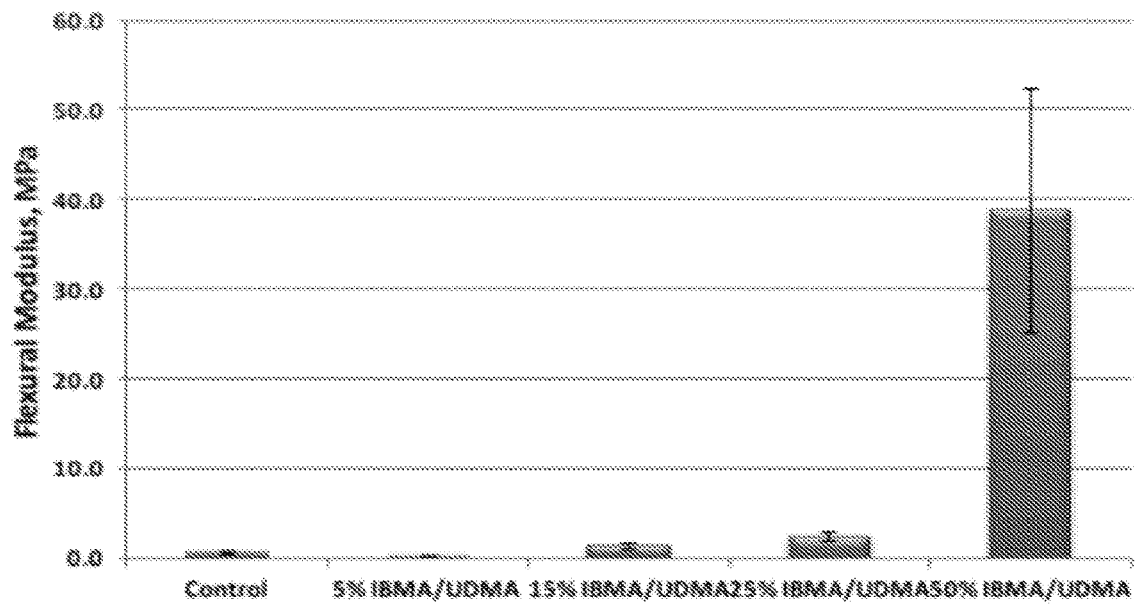
FIG. 21 is a graph of average flexural modulus for a high Tg nanogel (IBMA/UDMA at a 7:3 ratio having a Tg of 80° C.) in a low Tg polymer matrix (butyl acrylate monomer having a Tg of −54° C.).
Figure 22:
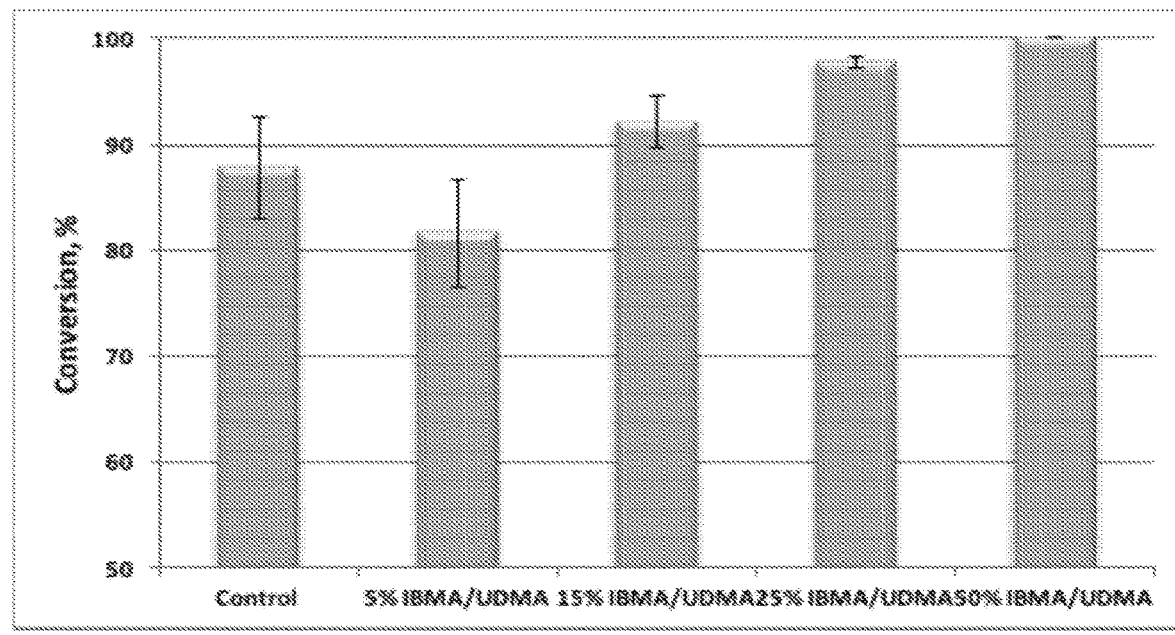
FIG. 22 is a graph of the average final conversion percentage for a high Tg nanogel (IBMA/UDMA at a 7:3 ratio having a Tg of 80° C.) in a low Tg polymer matrix (butyl acrylate monomer having a Tg of −54° C.). Increasing concentration of low Tg nanogel results in an increase in overall conversion.

These nanogels can be designed with a broad range of bulk nanogel Tg. See, e.g., FIG. 10. This enables formation of well controlled nano-domains where the Tg can be below, equivalent or greater than that of the matrix polymer, which fully infiltrates the nanogel structures. Depending upon the Tg of the nanogel and base polymer, different structural effects may be realized as a function of nanogel loading. For example, as set forth in FIG. 11, for a low Tg nanogel, high Tg polymer matrix system a substantial increase in toughness may be realized even at relatively low nanogel loadings followed by a further increase that plateaus at relatively moderate and high nanogel loadings. In contrast, for a high Tg nanogel, high Tg polymer matrix system, a relatively linear increase in toughness was realized as a function of nanogel loading as shown in FIG. 12. Still further, FIG. 13 shows a high Tg nanogel, low Tg polymer matrix system that, although having increase polymerization reaction kinetics for each loading of nanogel, the structural effects of the nanogel were not be realized until relatively high, confluent-level nanogel loadings. These results are indicative of the wide range of nanogels that can be synthesized and added to a base monomer composition to form mono-mer-nanogel mixture and the wide range of application-specific bulk properties that may be achieved upon the polymerization of such a monomer-nanogel mixture.

Nanogel additives can greatly enhance reactivity of monovinyl monomers such as MMA, while also minimizing MMA volatility and while being able to dial in, enhance and/or maintain highly desirable properties of the base monomer and/or nanogel-monomer mixture.

With high Tg matrices, Low Tg nanogel provides excellent plasticization to yield tough, strong, high conversion polymers.

With low Tg matrices, high Tg nanogel addition improved conversion but reinforcement was not attained below confluent nanogel loading.

Reactive nanogels above the percolation threshold are necessary to produce stable crosslinked structures from monovinyl monomers that produce linear polymer.

Nanogel Construction

Internal nanogel network density controlled by monovinyl/divinyl ratio (9:1 to 1:1 molar ratio)—affects swelling potential.

Nanogel Group Concentration

Multifunctional but at much lower concentration compared with monomers.

Reactive Nanogels

Non-reactive nanogels are incapable of reacting with the functional groups of the base monomer (0%).

Reactive nanogels are surface functionalized (100%) to the maximum extent possible and this enables them to react completely with the base monomer.

Partially reactive nanogels are selectively surface functionalized (>100%) and therefore can also partially bind with the base matrix.

Nanogel Size

Alters the surface-to-volume ratio, which affects swelling as well as viscosity effects.

Other Properties

Type of functionality: methacrylic, acrylic, maleimide, vinyl sulfones, isocyanates, alcohols, expoxy. Number of functional groups: 0 to 25. Branching density: 1 to 100 nm. Solubility: polar, protic, aprotic, non-polar solvents.

In various embodiments, the nanogel synthesis involves radically induced (photo, thermal, redox and RAFT initiation approaches have been used) polymerizations of moderate to concentrated solutions of mono- and di-vinyl monomers, which have been drawn from (meth)acrylates (offering tremendous variety in available structures/properties).

In certain aspects, macrogelation is avoided by use of a chain transfer agent to controllably reduce polymer chain lengths, which in combination with the solvent, provides an effective means to produce discrete, high molecular weight nanogel structures.

In certain embodiments, nanogel synthesis is generally conducted to high conversion (>85%) followed by mid- or near-IR (NIR) spectroscopy.

In aspects, isolation of the nanogel from any remaining starting materials is achieved by a simple, efficient precipitation.

Bulk nanogel is analyzed by solution-state NMR spectroscopy to determine composition and by gel permeation chromatography (GPC), which gives detailed information regarding particle structure and dimensions. Our laboratory uses triple detection (differential refractive index, viscosity, light scattering) GPC, which provides extensive polymer characterization information including: absolute molecular weight (critical for highly branched structures), polydispersity, branching density, hydrodynamic radius and intrinsic viscosity. Our GPC studies demonstrate that we can reproducibly prepare nanogels with molecular weights of $10^4$ to $>10^7$, polydispersities of about 2 to >10, and swollen particle sizes of 5 to 50 nm (from GPC based light scattering in THF).

In another embodiment, nanogels are readily re-dispersed to give optically clear, stable nanoparticle suspensions in appropriate solvents or liquid monomers, even viscous dental resins.

In one aspect, the disclosure provides complete control over the concentration of reactive groups added and the distribution of reactive sites between the nanogel and any resin to which it is added based on the nanogel loading level used.

In one embodiment, the unique nanogel materials are discrete nano-scale (10-50 nm) spherical or globular bundles of short polymer chains that are densely interconnected through covalent internal crosslinks and cycles (Moraes, 2011a). Each particle represents a single macromolecule where a typical individual polymer chain within the nanogel may be based on the addition of only about 15-30 vinyl monomer units, but it may contain 10 or more branch points that lead to similar adjacent chains. Even with nanogel molecular weights over 10,000,000 Da, the particles can be stably dispersed in monomer to give clear colloidal suspensions. Since the nanogels are initially formed in solution, they can be re-swollen by monomer or solvent to contribute to or become the sole source of a polymer network.

In certain embodiments it was determined that a nanogel loading of about 25% provided overlap of the reactive nanogel particles and that the particles could then link together to create a secondary reinforcing network that is interconnected with the base polymer network.

An important aspect of successful function of a dental composite, cemented crown or inlay is the adhesive used to bond the dental material to the tooth. Particularly in cases of dentin bonding, the choice of the bonding resin is critical. A large portion of the adhesives used in the placement of dental composite restoratives rely on relatively hydrophilic monomers dissolved in a volatile solvent such as acetone or ethanol. The hydrophilicity is necessary so the monomers can effectively penetrate into the acid-demineralized collagen network of etched dentin. A common example of a bonding resin composition consists of Bis-GMA, which provides moderate hydrophilic character but also mechanical strength and crosslinking, while 2-hydroxyethyl (meth)acrylate (HEMA) is included to provide substantial hydrophilicity to the overall resin. The HEMA as well as the water compatible solvent, carry the Bis-GMA into the collagen network. The majority of the solvent is then removed assisted by a gentle stream of air to thin the adhesive layer and accelerate evaporation. The single or multiple coatings of the adhesive are then typically photopolymerized prior to placement of the dental composite. The oxygen inhibited (meth)acrylate groups that remain unreacted after photocuring the adhesive, can then interact with the (meth)acrylate monomers introduced by the composite. When the composite is subsequently photopolymerized, the adhesive layer, which is predominantly physically interlocked with the dentin, copolymerizes with the composite resin to provide a strong attachment between the composite restorative and the tooth. However, due to its hydrophilic nature, the adhesive picks up significant amounts of water. This significantly weakens the polymer and reduces the bond strength. The adhesive layers often fail with water channels opening along this interfacial zone. As a means to overcome the degree of water uptake in the bonding resin and more importantly, to improve the long term integrity and strength of dental adhesives, we have proposed the use of nanogel additives that are hydrophobic, high modulus and reactive. Since the nanogel particle size is well below that of the dimensions of the interconnected collagen pore structure, the expectation is that nanogels can infiltrate the dentin along with the solvent and comonomers. When copolymerized with the conventional hydrophilic adhesive monomers, the nanogels can reduce the potential for water uptake and reinforce the polymer mechanical strength of the network especially in terms of the wet strength.

In another embodiment, the disclosure provides new water compatible nanogel compositions to be added to BisGMA/HEMA or other adhesive monomer systems, as well as used alone to form polymer networks exclusively from reactive nanogels dispersed in water (or other inert solvents). Also included is work with functionalized bioactive nanogels that can further enhance the performance of the experimental adhesive materials. A notable advantage that advocates for the use of nanogels in moist dentin bonding applications is that monomeric components that individually are not water compatible (i.e. nanogels comprised of 30-50 mol % BisEMA, an extremely hydrophobic monomer) can be converted into a fully water compatible nanogel. Our preliminary work with both hydrophilic and amphiphilic nanogels that can be dispersed readily in water has shown that the incorporation of these nanogels (unlike the results obtained with hydrophobic nanogels) into a model adhesive resin significantly suppressed phase separation in BisGMA/HEMA/nanogel/water mixtures. As an added benefit, the addition of the instant water dispersible nanogels can decrease oxygen inhibition, as described below.

In one aspect, surprisingly only 25 wt % of a moderately hydrophobic, reactive nanogel based on BisEMA and isobornyl methacrylate (IBMA) was found to increase dry flexural strength of a BisGMA/HEMA experimental adhesive from 33.8±1.3 MPa to 44.9±2.6 MPa.(Moraes, 2011b). However, the critically important result is that for the control, the fully water equilibrated wet adhesive strength dropped by half to 15.7±2.0 MPa while wet strength of nanogel-modified adhesive was unchanged at 46.7±1.2 MPa. Modulus was also unchanged between dry (0.80±0.01 GPa) and wet (0.80±0.04 GPa) conditions for the nanogel adhesive while the control decreased from 0.45±0.01 GPa to 0.29±0.03 GPa upon water storage. In micro-tensile dentin bond strength testing, the nanogel-modified adhesive produced strong durable bonds compared with the control. Effective infiltration of the nanogel into the demineralized dentin was verified by use of an analogous fluorescently tagged nanogel using confocal laser scanning microscopy. The nanogels used in that study were relatively hydrophobic and required use of a solvated (ethanol or acetone) adhesive. In spite of providing excellent dentin bonding results, the hydrophobic nanogels actually promoted phase separation in the adhesive at even lower water concentrations compared to the nanogel-free control resin.

The ability to control molecular weight and polydispersity during nanogel synthesis is expected to greatly aid efforts towards maximizing practical nanogel loading limits in solvent and monomer since this provides better control of overall interfacial surface area and interparticle spacing. Each nanogel particle is composed of many (10's-100's) covalently interconnected chains and more uniform individual polymer chain lengths are expected to result in nanogels with correspondingly narrower ranges of molecular weight and particle size distribution. There is not necessarily a direct correlation between nanogel molecular weight and dimension since the internal branching density inversely influences the swollen diameter. In the case of nanogels for use in dental adhesives, molecular weight and polydispersity are related to the size and size distribution of the monomer- or solvent-swollen nanogel structures. For dental adhesive applications, nanogel components need to be of appropriate size to accommodate the spatial constraints of the demineralized collagen matrix. In one aspect, reversible-addition-fragmentation-transfer (RAFT) "living" radical polymerization mechanism is used to make very low polydispersity index nanogels (PDI=1.3). This aspect is exploited to control nanogel size and size distribution to fit the collagen interfibrillar spacing based on the solubility parameter of the specific nanogel-modified adhesive being used. (Pashley, 2007). The target dimensions of approximately 20-30 nm for the globular nanoparticle diameters necessary to span the gaps in the collagen matrix are well suited to the nanogel technology. Another potential advantage to narrower nanogel size distribution is that the viscosity at a given nanogel loading is reduced. Regarding the design of amphiphilic nanogels that permit water dispersion of relatively hydrophobic polymeric materials, RAFT polymerizations can be used to form relatively hydrophobic nanogel structures that will then be continued by the addition of more hydrophilic monomers to the "living" chain ends to yield unique copolymers. Nanogels of this type could be considered "smart" materials where hydrophilic groups can either be retracted or extended depending on the local environment.

In another embodiment, solvent dispersed nanogels (water for purely hydrophilic nanogels and either water or ethanol, acetone, etc. including mixed solvents for amphiphilic nanogels) are used to demonstrate the potential network structure and properties contributed by specific nanogels polymerized as components of adhesive resins. By using inert solvents as the dispersion medium, we can probe how features like nanogel structure and Tg, reactive group concentration, solvent polarity, particle size and nanogel loading level influence ultimate network structure and properties. Critical levels of nanogel loading needed to achieve effective nanogel coalescence and extended 3D network structure have been demonstrated. The same nanogel has been shown to give very different polymer structure as various control parameters are systematically varied. Together the physical analyses of nanogel-based polymers formed in solvent (reaction kinetics, gel fractions, SEM of gels, DMA determination of crosslink densities) and rheologic data can identify nanogel percolation threshold and dense packing limit.

Figure 8:
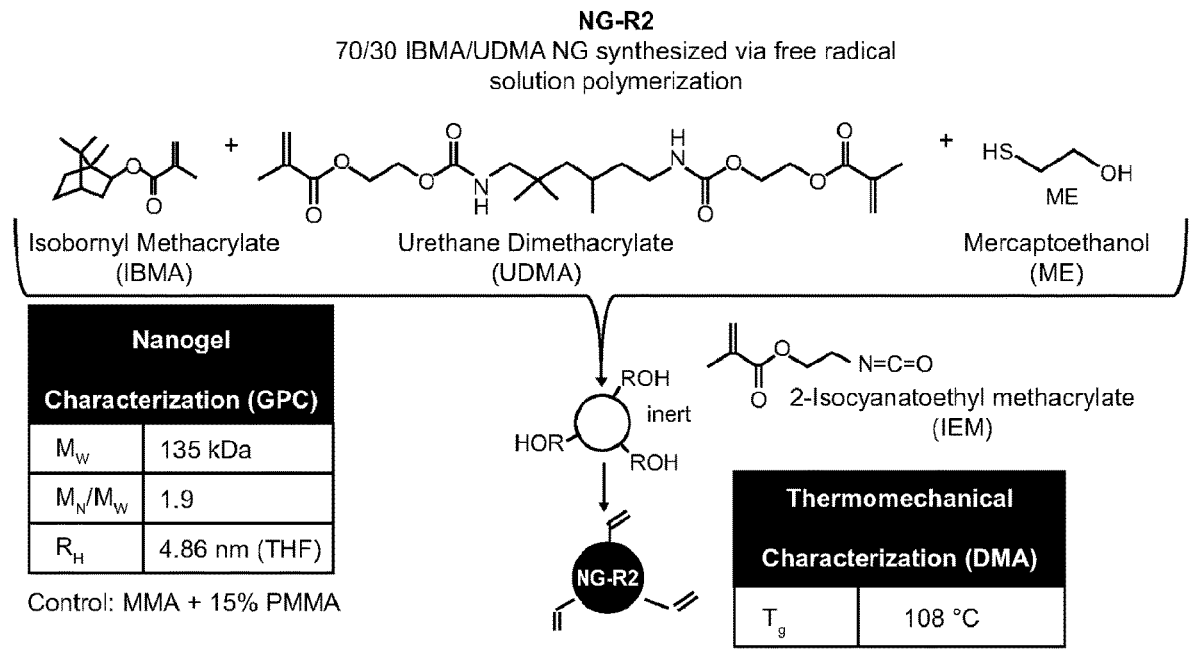
FIG. 8 (a) is a diagram showing the preparation of a 70/30 IMBA/UDMA reactive nanogel (R2) via free radical solution polymerization and (b) is a diagram showing the preparation of a 70/30 IMBA/UDMA non-reactive nanogel (R5) via free radical solution polymerization.
Figure 8:
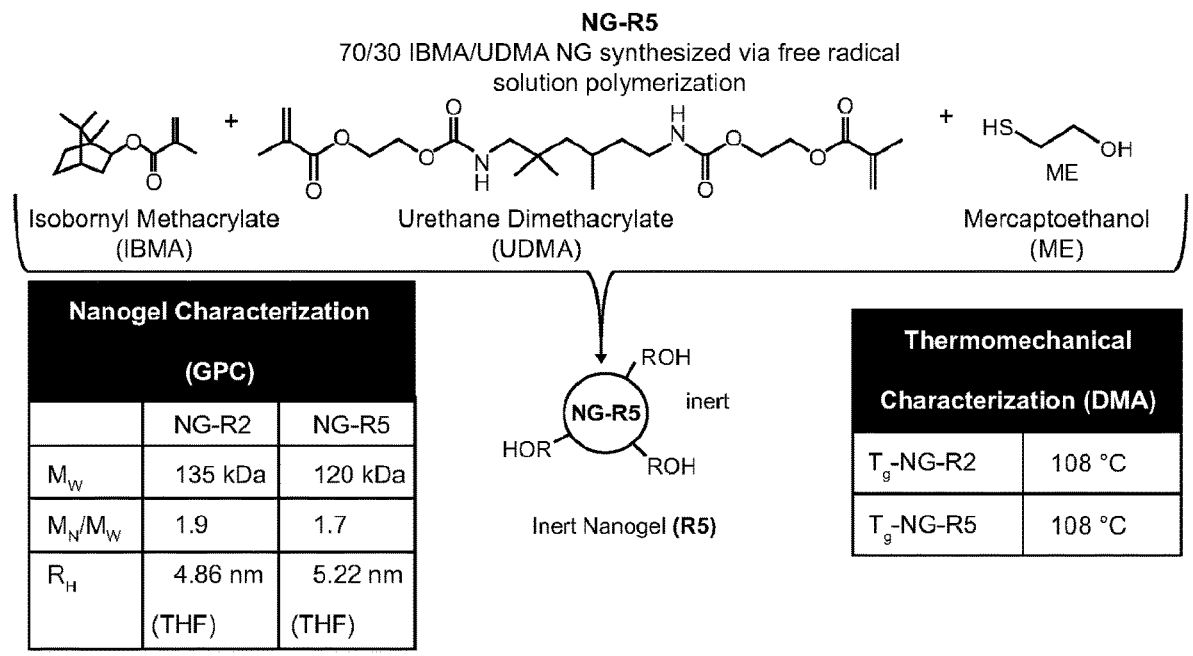

Solvent dispersed nanogels were found create porous 3D networks at lower nanogel loading, while at higher loading levels, the same nanogel in the same solvent gives a dense network due to fully contiguous overlapping distribution of nanogel structures at the time of polymerization (See, e.g., FIG. 8). It should be recognized that very high nanogel loading (up to 80 wt % currently) can be achieved with the generation of very dense, novel network structures.

In one aspect, surprisingly, very hydrophobic building blocks (such as >50 mol % BisEMA or UDMA) can be used to prepare nanogels that are freely water dispersible. Therefore, the amphiphilic nanogels provide a route to dense, strong and homogeneous polymer networks can be formed even in the presence of water. Since adhesive resins such as BisGMA/HEMA are considerably more complex than single solvents, hydrogenated versions of these comonomers have been utilized to serve as inert nanogel carriers that will allow us to determine appropriate nanogel loading levels while also examining the for potential selective infiltration of one monomer over the other into certain nanogel materials using rheologic analyses in the monomeric state and DMA studies of polymerized materials. Solvent-dispersed nanogels will inform our work with nanogel additives in monomers but are also of significant interest for monomer-free adhesive formulations based only on reactive nanogels to provide dense water compatible polymer networks with a range of hydrophilic character.

A variety of water dispersible or near-water dispersible nanogels have been used to improve the wet strength of conventional water compatible polymers such as HEMA- and poly(ethylene glycol)dimethacrylate (PEGDMA). With the hydrophilic character increasing as the monovinyl monomer component of the nanogel is changed from HEMA to EHEMA to $E_{10}$HEMA, this allows more hydrophobic divinyl monomers to be incorporated without sacrificing the water compatibility. In these amphiphilic nanogel structures, the compatibility or homogeneity between the hydrophobic and hydrophilic monomers is enforced by their preformed covalent attachment such that even in water, relatively hydrophobic nanogels can successfully be employed. To demonstrate this, 50 wt % loadings of various reactive nanogels were introduced into HEMA monomer giving well dispersed, completely transparent samples that were then photopolymerized in bulk. The dry modulus was in three-point bending mode and then additional samples were stored in water until equilibrium water uptake was achieved. The amount of water taken up and the wet modulus were determined and compared with the results from HEMA homopolymer. The dry modulus of the nanogel-modified pHEMA was dramatically enhanced, by up to 100 times. However, the differential between the control and the nanogel-modified materials in the wet state was even more pronounced. It is noteworthy that based on the water uptake results, there are examples of water compatible nanogels, such as $E_{10}$HEMA/BisGMA or $E_{10}$1-1EMA/BisEMA that actually increase the water uptake of the polymer while raising its wet modulus by up to 1000 times.

In another embodiment, the disclosure relates to a method to provide a monomer-free macroscopic polymer network, the method comprising (i) combining a first monomer mixture comprising at least one functional monomer, at least one divinyl monomer, a difunctional chain transfer agent, and an initiator; (ii) polymerizing said first monomer mixture to form a functionalized nanogel; (iii) reacting the functionalized nanogel with a reactive olefinic compound to form a reactive nanogel with pendant olefinic groups; (iv) adding the reactive nanogel to an inert matrix to create a second mixture; and (v) polymerizing the second mixture, in which the nanogel loading exceeds the percolation threshold, to provide a monomer-free macroscopic polymer network with the strength solely dependent on the nanogel structure and loading level within the inert matrix. In one aspect, the pendant olefinic groups are selected from styryl, allyl, vinyl ether, and (meth)acrylate groups. In one aspect, the reactive olefinic compound is selected from (meth)acryloyl chloride, (meth)acrylic anhydride, (meth)acrylic acid, isocyanatoalkyl(meth)acrylate, isocyanatoethyl(meth)acrylate vinylbenzene chloride, chloroethyl vinyl ether, allyl chloride and isocyanatomethyl(meth)acrylate. In another aspect, the difunctional chain transfer agent is selected from mercaptoethanol, mercaptopropanol, 3-mercapto-2-butanol, 2-mercapto-3-butanol, 3-mercapto-2-methyl-butan-1-ol, 3-mercapto-3-methyl-hexan-1-ol, 3-mercaptohexanol, 3-mercaptopropionic acid, and cysteine. In one aspect, the reactive nanogel is added in about 10 wt % to about 80 wt %, compared to the weight of the inert matrix. In one aspect, the reactive nanogel is added in about 50 wt % to about 80 wt %, compared to the weight of the inert matrix. In one aspect, the reactive nanogel is added in about 5 wt % to about 35 wt %, compared to the weight of the inert matrix. In one aspect, the reactive nanogel is added in about 15 wt % to about 50 wt %, compared to the weight of the inert matrix.

Recent work in our group has concentrated on synthesizing and incorporating nanogels (NGs) within crosslinked networks and characterizing their ability to alter specific bulk network properties while enhancing and/or maintaining the inherent advantageous material properties without compromising the efficiency of polymerization kinetics. The versatile NGs can be also be functionalized with reactive sites thereby enabling them to covalently within a host polymer matrix while the non-functionalized NGs can behave as inert fillers within the polymer. Given the limitless choice of monomers that can be implemented to form these are discrete, short polymer chains with each NG forming a densely interconnected chain, the ability to synthesize these nano-scale, optically clear particles that can selectively alter a specific network property such as its glass transition temperature, shrinkage stress or its hydrophilicity while maintaining other desirable networks. The NGs are globular, compact, and highly cross-linked polymer nanoparticles (typically 5-50 nm in size) synthesized via a solution polymerization reaction, and therefore maintain the ability to swell predictably when dispersed within an appropriate solvent or monomer. By incorporating NGs within a linear polymer networks such as MMA, the ability of NGs to swell with the monomer can be utilized to contain the monomer locally and enhance polymerization rate by creating local polymerization "hot spots" that increase the viscosity and contribute increase to the overall reaction kinetics of the system. Unlike other additives, the enhanced kinetics achieved via inert NGs incorporation can be implemented in a manner that does not impact the linearity of the parent network.

EXAMPLE

Towards this end, MMA networks with different concentrations of both functionalized and non-functionalized NGs were formulated and characterized for their network kinetics, thermomechanical and mechanical properties. Samples with different concentration of a urethane dimethacrylate, UDMA was utilized as a control. The NGs utilized in this study is a well-characterized NG with glass transition temperature of 108° C. and was chosen such that the thermomechanical properties of the parent MMA matrix was minimally impacted via the NG additive.

Materials and Samples Preparation

MMA, isobornyl methacrylate (IBMA), urethane dimethacrylate (UDMA), Ciba® IRGACURE® 819 (Ir. 819), 2-mercaptoethanol (2-ME), 2,2'-Azobis(2-methylpropionitrile) (AIBN), methyl ethyl ketone (MEK), and tetrahydrofuran (THF) were all used as received. See FIG. 8.

Polymer films were formulated by casting the monomer formulation between Rain-X treated glass slides with a 1/32" (0.8 mm) thick silicone spacer. The films were cured under mercury arc lamp (320-390 nm, 10 mW/cm$^2$) within a custom polymerization box.

Nanogel Synthesis and Characterization

The molecular weight of the nanogel was determined by a Viscotek-270 dual detector, VE3580 RI detector based gel permeation chromatography(GPC) with tetrahydrofuran (0.35 mL min-1) used as the mobile phase at a column temperature of 35° C.

Polymer Characterization

The photopolymerization of the samples were monitored via observing the FTIR spectra (Near-IR monitor wavenumber 6,125 cm$^{-1}$) taken on a NICOLET iS50 FT-IR (Thermo Scientific, USA).

Dynamic Material Analysis

The glass transition temperature and modulus was measured using a Q800 DMA from TA Instruments. Polymer films (dimensions 16 mm×4 mm×0.8 mm) with different nanogel mass fractions were formulated and DMA multi strain mode was utilized by applying a sinusoidal stress of 1 Hz frequency with the temperature ramp rate of 3° C./min from 0 to 200° C. The glass transition temperature, $T_g$ was determined as the peak of the tan delta curve and rubbery modulus was measured at $T_g$+50° C.

The % transmittance of light through the MMA films at different nanogel mass fractions was quantified using a UV-visible Spectrophotometer (Evolution 201, Thermo Scientific). Films (0.8 mm thick) were attached onto the surface of a quartz cuvette and carefully introduced into the sample compartment of the spectrometer.

Mechanical Testing of the formulations were conducted on a universal testing machine (Mini Bionix II, MTS, Eden Prairie, Minn., USA) in three-point bending with a span of 10 mm and a cross-head speed of 1 mm/min. Testing was performed on bar specimens prepared from 2 mm×2 mm×15 mm elastomer molds sandwiched between glass slides and photopolymerized.

Results

Table 1 (below) provides GPC and DLS results of IBMA/UDMA nanogels used in the Example 1. The non-reactive nanogels were treated with 2-ME to terminate all unreacted sites with hydroxyl groups. Reactive nanogels were additionally functionalized to add methacrylate functional groups to the hydroxyl sites via urethane bonds. See FIG. 8.

TABLE 1

|  | Reactive Nanogel (R2) | Non-Reactive Nanogel (R5) |
| --- | --- | --- |
| $M_N$ (GPC) | 70.93 kDa | 72.32 kDa |
| $M_W$ (GPC) | 135 kDa | 120 kDa |
| $M_N/M_W$ | 1.9 | 1.7 |
| $R_H$ (GPC) | 4.86 nm | 5.22 nm |

Table 2 provides thermomechanical characterization of the MMA-NG-R2 nanogel samples, MMA-NG-R5 nanogel samples and MMA-UDMA samples indicate that the MMA-NG-R2 samples and MMA-UDMA samples crosslink the polymer as seen by the significant increase in rubbery modulus.

TABLE 2

| Samples | $T_g$ (° C.) | Rubbery Modulus (at $T_g$ + 50° C.) (MPa) |
| --- | --- | --- |
| MMA/15% PMMA | 113 | 0.79* (modulus just prior to sample melting at 165° C.) |
| 25% UDMA | 139 | 5.8 |
| 50% UDMA | 137 | 17.6 |
| 25% NG-R2 | 127 | 1.3 |
| 35% NG-R2 | 132 | 1.4 |
| 50% NG-R2 | 130 | 1.4 |
| 25% NG-R5 | 124 | 0.51 |
| 50% NG-R5 | 127 | 1.3 |

FIG. 1: Real-time FTIR polymerization kinetics of MMA with reactive and unreactive nanogels (a) and UDMA (b) at various weight loadings. All formulations have 2 wt. % Ir. 819 photo initiator. Methacrylate conversion was calculated from the area of the carbon double-bond overtone band at 6,165 cm$^{-1}$. The samples were irradiated with 365 nm UV light at an intensity of 100 mW/cm$^2$ beginning 10 seconds after starting the run. When added to MMA at ≥15 wt % the nanogels, particularly reactive nanogels, also increases the reaction rate. Autoacceleration occurs earlier with the reactive nanogel. With the unreactive nanogel at 50 wt %, the final physically crosslinked MMA/nanogel polymer is completely soluble. With ≥15 wt % of the reactive nanogel in MMA, insoluble polymers were exclusively formed.

Figure 2:
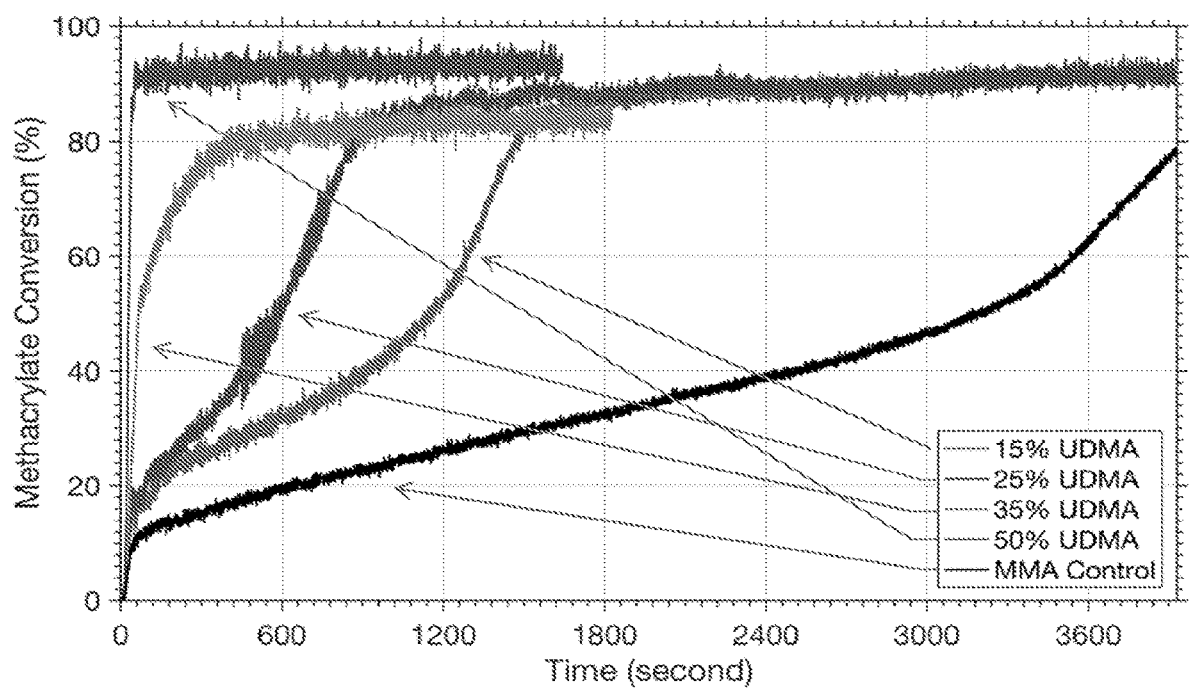
FIG. 2 is a graph is a graph of the degree of polymerization of methyl methacrylate (MMA) as a function of time (i.e., the photopolymerization kinetics) for MMA-UDMA mixtures at different concentrations of UDMA as described in detail in Example 1.

FIG. 2: Homogeneous crosslinking of MMA based on direct copolymerization. Real-time FTIR polymerization kinetics of MMA with reactive and unreactive nanogels (a) and UDMA (b) at various weight loadings. All formulations have 2 wt. % Ir. 819 photo initiator. Methacrylate conversion was calculated from the area of the carbon double-bond overtone band at 6,165 cm$^{-1}$. The samples were irradiated with 365 nm UV light at an intensity of 100 mW/cm$^2$ beginning 10 seconds after starting the run. The addition of a crosslinking comonomer such as UDMA to MMA results in more or less spatially uniform network formation throughout the polymer with the network density directly related to the ratio of the crosslinker used. Copolymerization kinetics are globally enhanced by the decreased mobility associated with network formation. With nanogel-based crosslinking, heterogeneous network formation can be introduced while allowing for regions that retain unaltered linear PMMA structure. FIG. 2 shows the DMA data for the addition of UDMA, rather than a nanogel, and it shows that the added UDMA, while enhancing the reaction kinetics, changed the thermomechanical properties of PMMA and the PMMA is no longer a linear polymer as indicated by the rubbery modulus in the DMA. Whereas when a non-reactive nanogel is added to MMA, the enhanced kinetics is observed while the bulk monomer remains a linear polymer.

Table 3 provides GPC analysis of the photopolymerized NG-R5-MMA polymer samples indicate that the linearity of the base MMA polymer is preserved after polymerization with the inert NG-R5 nanogels.

TABLE 3

|  | NG-R5/MMA polymer | NG-R5 |
| --- | --- | --- |
| $M_W$ | 175 kDa | 120 kDa |
| PDI | 2.9 | 1.7 |

Figure 3:
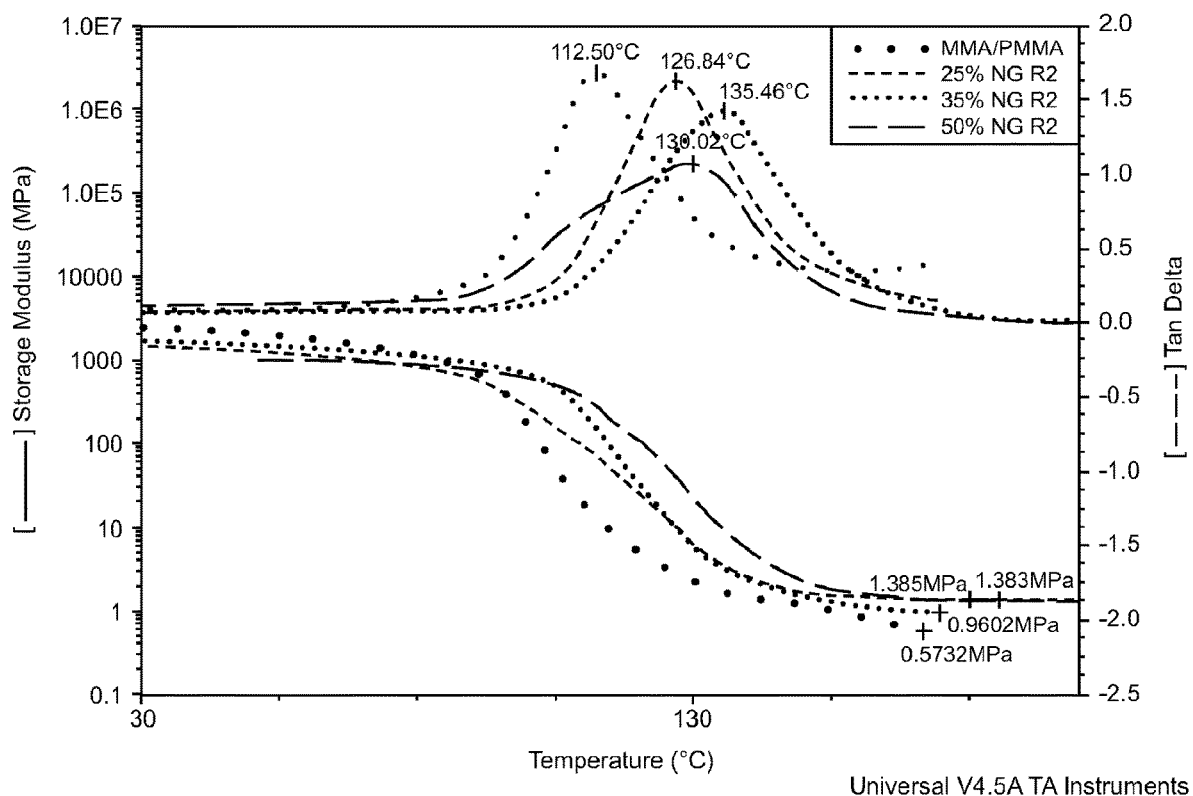
FIG. 3 is graph of DMA tensile measurements of reactive nanogels in MMA films (the group of upper plots) and unreactive nanogels in MMA films (the group of lower plots) at different concentrations of nanogel as described in Example 1.
Figure 4:
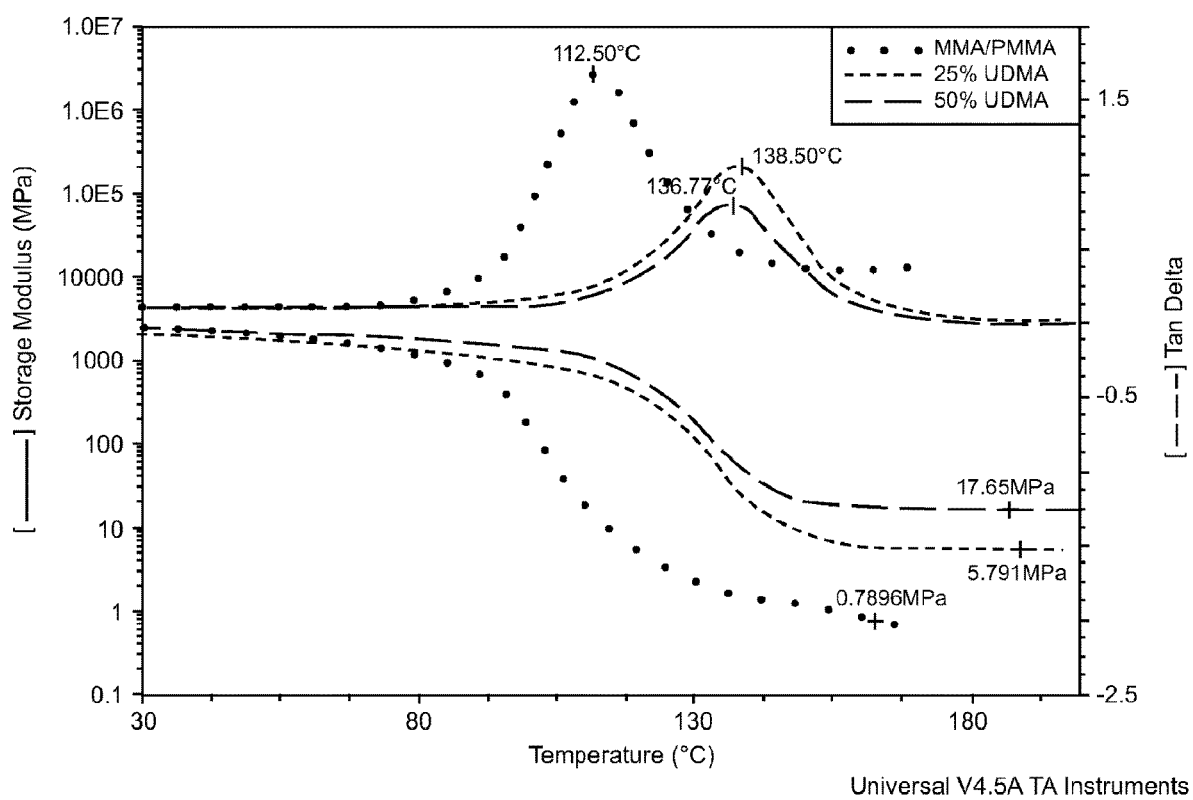
FIG. 4 is graph of DMA tensile measurements of UDMA in MMA films at different concentrations of UDMA as described in Example 1.

FIGS. 3 and 4: Glass Transition Temperature and Rubbery Modulus measurements of reactive NG, unreactive NG, and UDMA loaded PMMA films. The temperature was ramped at 3° C./min and the oscillation amplitude was 20 μm. The glass transition temperature is found from the peak of the tan delta curve. The rubbery modulus of cross-linked films is from the storage modulus plateau at $T_G+50°$ C. The less distinct rubbery modulus plateau seen in the MMA/PMMA control and lower loadings of reactive nanogels indicative a polymer that is more thermoplastic in nature.

Figure 5:
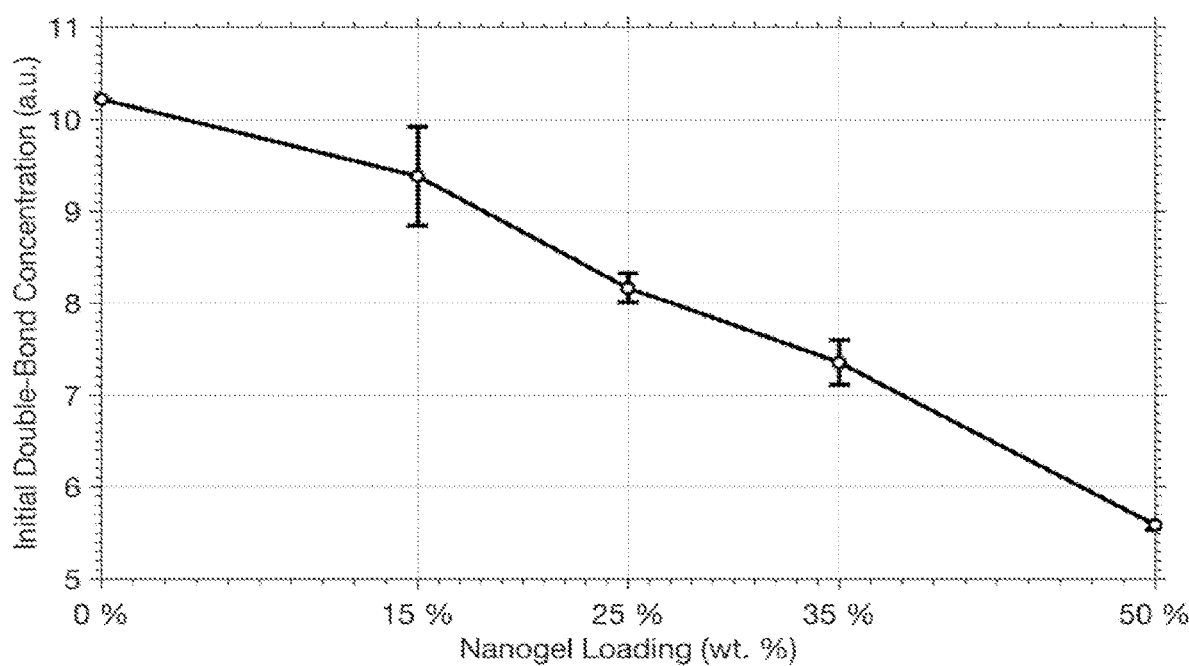
FIG. 5 is a graph of the initial double-bond concentration determined from FTIR peak area as a function of nanogel concentration as described in Example 1.

FIG. 5: Initial double-bond concentration from FTIR peak area (6,250 cm−1 to 6,100 cm−1, vinyl overtone peak) versus loading of reactive nanogels NGs into MMA. All measurements were made using the same spacer material for consistent thickness. Data averaged over n=3 runs. The total double bond concentration decreases with loading as the NG displaces MMA.

Figure 6:
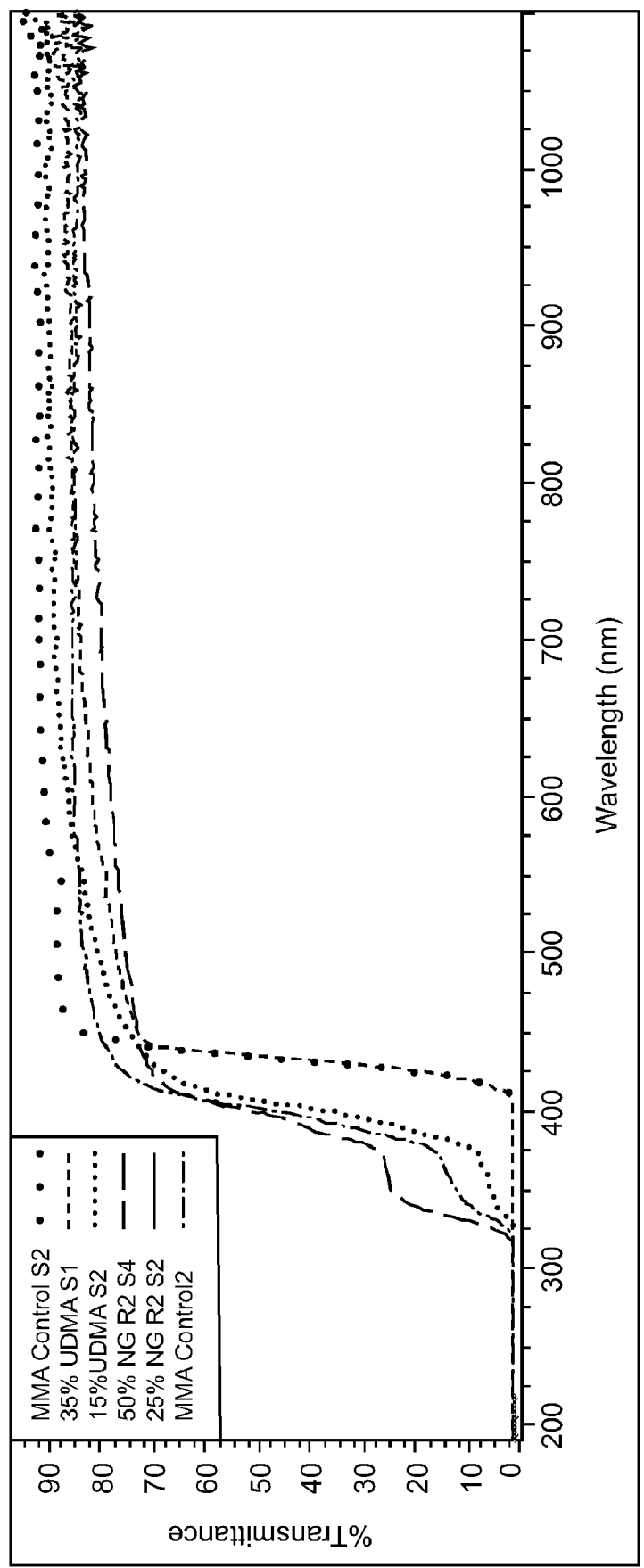
FIG. 6 is graph % Transmittance as a function of wavelength (i.e., UV-Vis spectra) of MMA films containing different concentrations of nanogel and UDMA as described in Example 1.
Figure 7:
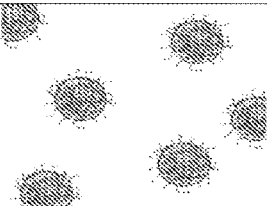
FIG. 7 contains schematic diagrams of degrees of nanogel concentrations or loadings referred to as Discontinuous, Percolation Threshold, Co-continuous, and Confluent.
Figure 7:
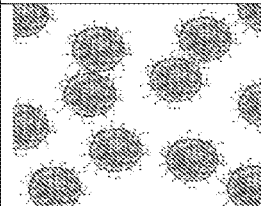
Figure 7:
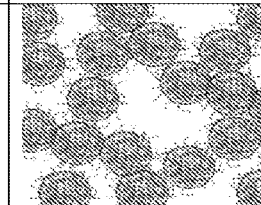
Figure 7:
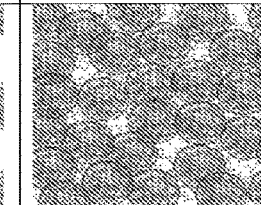

FIG. 6: A comparison of the optical translucency of the NG-MMA films and the UDMA-MMA films measured via UV Spectroscopy. All films show comparable transparency before the onset of strong absorption in the UV due to the photoinitiator.

Figure 23:
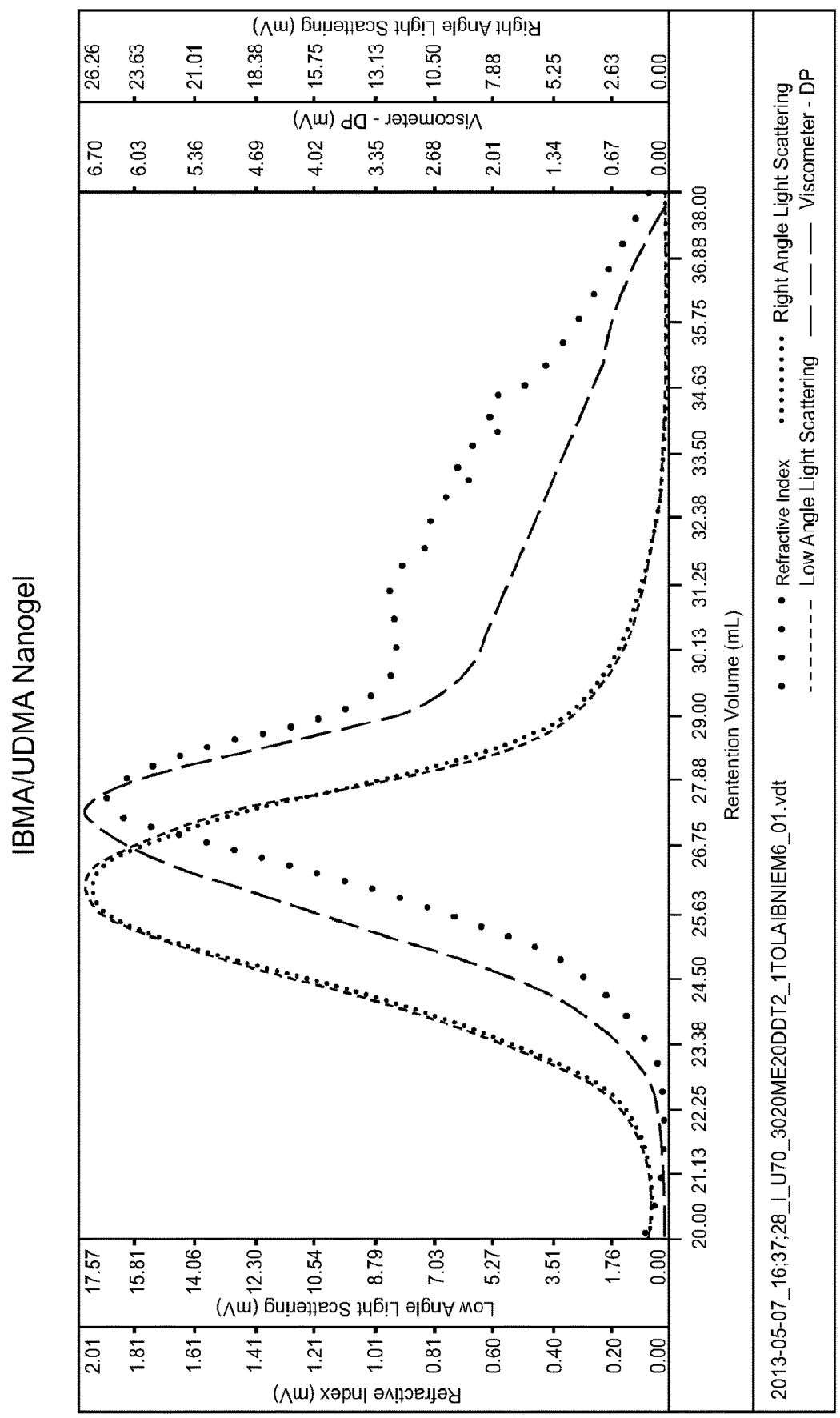
FIG. 23 contains graphs of refractive index as a function of retention volume for IBMA/UDMA nanogel, poly-methyl methacrylate (PMMA) homopolymer, and PMMA+1 wt % IBMA/UDMA nanogel. Photocured to 5% conversion, residual MMA monomer evaporated, and high molecular weight species isolated by precipitation by TD-GPC characterization. Addition of low nanogel concentration results in a loosely crosslinked, high molecular weight polymer.
Figure 23:
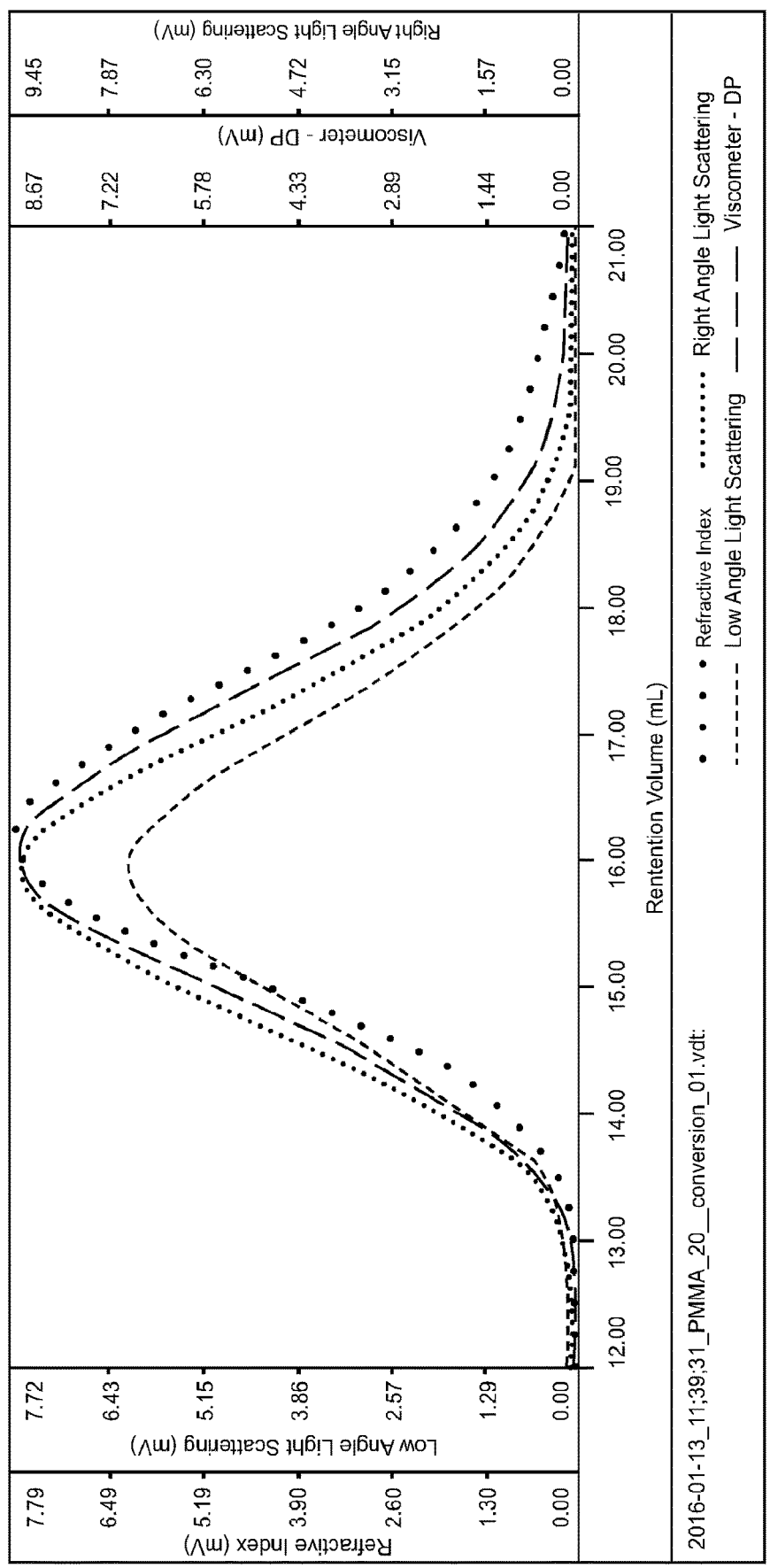
Figure 23:
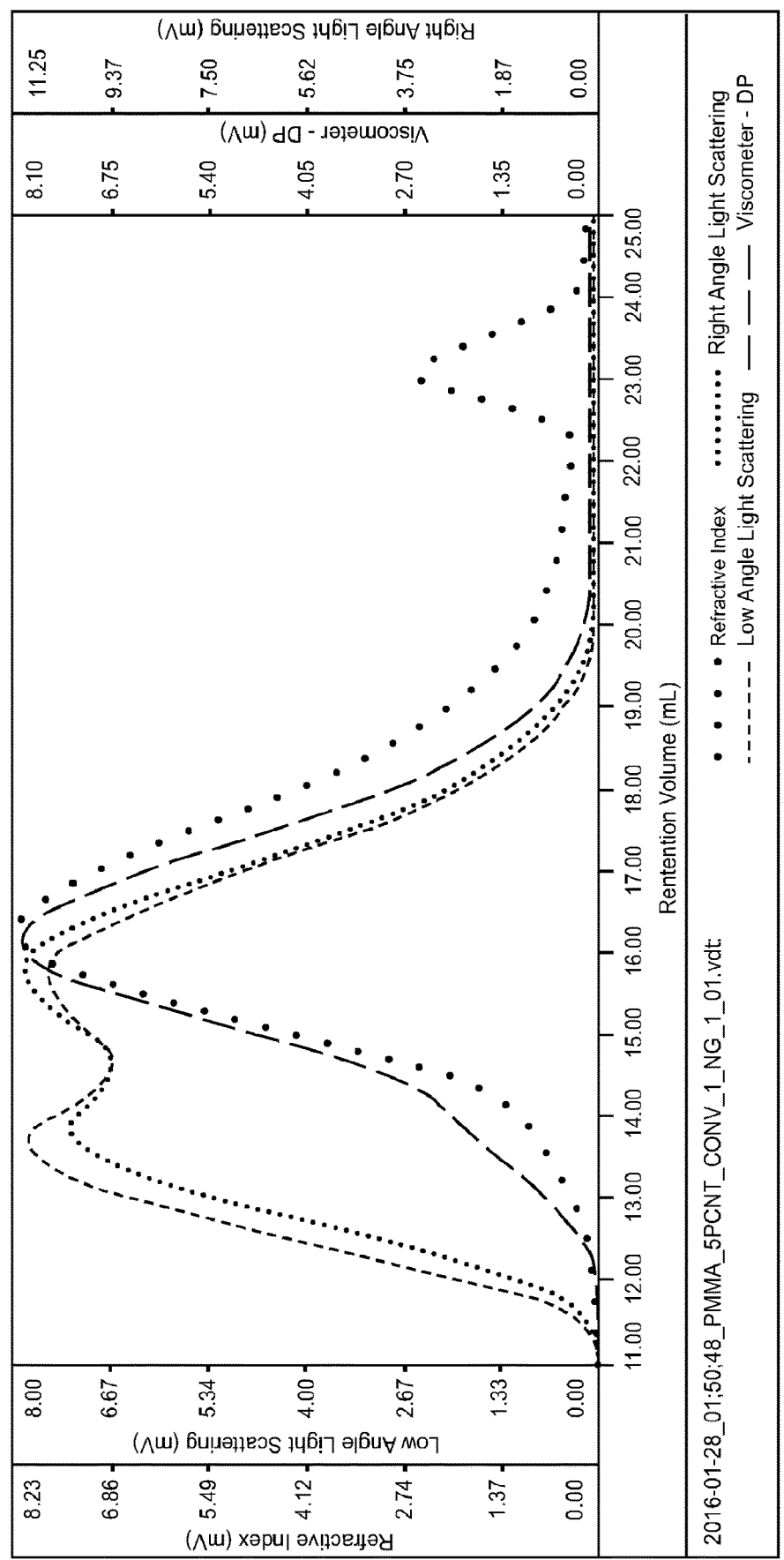

FIG. 23: An approximate 10-fold increase in nanogel MW and 3-fold increase in size but no long range network formation at this low nanogel loading level.

Both inert and reactive nanogels can significantly enhance the photopolymerization kinetics of MMA to PMMA while maintaining the $T_g$ of the MMA monomers.

Inert nanogels can maintain the linearity of the MMA polymer while enhancing the photopolymerization kinetics.

The reactive nanogels maintain the mechanical properties of the material up to 25% nanogel concentration while the presence of inert nanogels significantly alter the strength of the PMMA polymer.

A combination of inert and reactive nanogels can be utilized to attain optimal kinetic properties and the required mechanical strength for PMMA networks.

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

To the extent necessary to provide descriptive support, the subject matter and/or text of the appended claims is incorporated herein by reference in their entirety. It will be understood by all readers of this written description that the exemplary embodiments described and claimed herein may be suitably practiced in the absence of any recited feature, element or step that is, or is not, specifically disclosed herein.

Throughout this disclosure, the term "a" or "an" entity refers to one or more of that entity; for example, "a terpene," is understood to represent one or more "terpenes". As such, the terms "a" (or "an"), "one or more," and "at least one" can be used interchangeably herein.

Furthermore, "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

It is understood that wherever aspects are described herein with the language "comprising," otherwise analogous aspects described in terms of "consisting of" and/or "consisting essentially of" are also provided.

Unless defined otherwise, technical and scientific terms used herein have the same meaning as commonly understood by one of ordinary skill in the art to which this disclosure is related. Numeric ranges are inclusive of the numbers defining the range. The headings provided herein are not limitations of the various aspects or aspects of the disclosure, which can be had by reference to the specification as a whole. Accordingly, the terms defined immediately below are more fully defined by reference to the specification in its entirety.

What is claimed is:

1. A method of increasing a polymerization reaction rate of a base monomer composition, the method comprising combining an effective amount of a nanogel with the base monomer composition to form a monomer-nanogel mixture;
    wherein the base monomer composition comprises a monomer selected from the group consisting of methyl methacrylate (MMA), n-butyl acrylate, isobornyl acrylate, and combinations thereof; and
    wherein the nanogel is soluble in the base monomer composition and wherein the nanogel is derived from a nanogel-forming monomer mixture that comprises:
    at least one monovinyl monomer;
    at least one divinyl monomer;
    a chain transfer agent; and
    an initiator.

2. The method of claim 1, wherein the nanogel has an effective diameter in a range of about 1.5 nm to about 50 nm.

3. The method of claim 1, wherein the nanogel has a molecular weight in a range of about 5 kDa to about 200 kDa.

4. The method of claim 1, wherein the effective amount of a nanogel corresponds to a nanogel loading of at least 1 weight %, based on the weight of the monomer-nanogel mixture.

5. The method of claim 1, wherein the free-radical polymerization reaction is photo-initiated or thermal-initiated.

6. The method of claim 1, wherein the free-radical polymerization reaction is photo-initiated.

7. The method of claim 1, wherein nanogel is selected from the group consisting of a non-reactive nanogel, a reactive nanogel, partially reactive nanogel, and combinations thereof.

8. The method of claim 7, wherein nanogel is a non-reactive nanogel.

9. The method of claim 8, wherein the non-reactive nanogel is at a nanogel loading not exceeding about 50 wt %, based on the weight of the monomer-nanogel mixture.

10. The method of claim 8, wherein the non-reactive nanogel is at a nanogel loading in a range of about 5 wt % to about 25 wt %, based on the weight of the monomer-nanogel mixture.

11. The method of claim 8, wherein the non-reactive nanogel is at a nanogel loading in a range of about 50 wt % to about 75 wt %, based on the weight of the monomer-nanogel mixture.

12. The method of claim 7, wherein nanogel is a reactive nanogel.

13. The method of claim 12, wherein the reactive nanogel is at a nanogel loading not exceeding 25 wt %, based on the weight of the monomer-nanogel mixture.

14. The method of claim 12, wherein the reactive nanogel is at a nanogel loading in a range of about 1 wt % to about 10 wt %, based on the weight of the monomer-nanogel mixture.

15. The method of claim 12, wherein the reactive nanogel is at a nanogel loading in a range of about 25 wt % to about 50 wt %, based on the weight of the monomer-nanogel mixture.

16. The method of claim 7, wherein nanogel is a partially reactive nanogel.

17. The method of claim 12, wherein the reactive nanogel is selected from the group consisting of thiol-functionalized nanogels.

18. The method of claim 1, wherein the nanogel has an effective diameter(s) in a range selected from the group consisting of about 1 nm to about 200 nm, about 1 nm to about 100 nm, and about 1 nm to about 50 nm.

19. The method of claim 1, wherein the chain transfer agent is selected from the group consisting of monofunctional thiols, difunctional thiols, trifunctional thiols, tetrafunctional thiols, pentafunctional thiols, hexafunctional thiols, octafunctional thiols, and bis(borondifluorodimethylglyoximate) cobaltate (II).

20. The method of claim 1, wherein said chain transfer agent is selected from the group consisting of propyl mercaptan, butyl mercaptan, hexyl mercaptan, octyl mercaptan, dodecanethiol, thioglycolic acid, methylbenzenethiol, dodecanethiol, mercaptopropionic acid, 2-ethyl hexyl thioglycolate, octylthioglycolate, mercaptoethanol, mercaptoundecanoic acid, thiolactic acid, thiobutyric acid, trimethylol propane tris(3-mercaptopropionate), pentaerythritol tetra(3-mercaptopropionate), pentaerythritol tetrathioglycolate, pentaerythritol tetrathiolactate, pentaerythritol tetrathiobutyrate, dipentaerythritol hexa(3-mercaptopropionate), di pentaerythritol hexathioglycolate, tripentaerythritol octa(3-mercaptopropionate), and tripentaerythritol octathioglycolate.

21. A monomer-nanogel mixture according to claim 1.

22. A method for preparing a polymer, the method comprising polymerizing the monomer-nanogel mixture according to claim 1.

23. A polymer derived from the monomer-nanogel mixture according to claim 1.

* * * * *